United States Patent

Haneda et al.

[11] Patent Number: 6,057,866
[45] Date of Patent: May 2, 2000

[54] COLOR IMAGE FORMING APPARATUS AND METHOD USING COLOR COMPENSATION

[75] Inventors: Satoshi Haneda; Hiroyuki Tokimatsu, both of Hachioji, Japan

[73] Assignee: Konica Corporation, Tokyo, Japan

[21] Appl. No.: 08/935,597

[22] Filed: Sep. 23, 1997

[30] Foreign Application Priority Data

Sep. 30, 1996 [JP] Japan ................................ 8-259130

[51] Int. Cl.⁷ .......................... B41J 2/385; G03G 13/00
[52] U.S. Cl. ..................... 347/118; 399/181; 347/143; 347/144; 347/131; 430/31
[58] Field of Search .................... 347/115, 129, 347/138, 139, 256, 140, 143, 144, 118, 131, 119, 132, 240, 251, 262, 264; 399/58, 98, 111, 118, 177, 181; 358/401, 501, 296, 298, 300, 500, 518; 430/31

[56] References Cited

U.S. PATENT DOCUMENTS

| 5,252,995 | 10/1993 | Trask et al. | 347/119 |
| 5,341,165 | 8/1994 | Suzuki et al. | 347/132 |
| 5,380,610 | 1/1995 | Haneda et al. | 430/31 |
| 5,438,437 | 8/1995 | Mizoguchi et al. | 347/118 |
| 5,602,629 | 2/1997 | Saito et al. | 399/58 |
| 5,663,787 | 9/1997 | Haneda et al. | 347/138 |

FOREIGN PATENT DOCUMENTS

| 0 701 180 A2 | 3/1996 | European Pat. Off. . |
| 6-149000 | 5/1995 | Japan . |
| 7-128946 | 5/1995 | Japan . |
| 10-063158 | 3/1998 | Japan . |
| 10-138568 | 5/1998 | Japan . |

*Primary Examiner*—N. Le
*Assistant Examiner*—L. Anderson
*Attorney, Agent, or Firm*—Frishauf, Holtz, Goodman, Langer & Chick, P.C.

[57] ABSTRACT

A color image forming method, including the steps of: charging a front surface of a photoreceptor; conducting image wise exposure onto the charged front surface from a rear surface of the photoreceptor so that a latent image is formed on the front surface; developing the latent image with a color toner so that a color toner image is formed on the front surface; and repeating the steps of charging, conducting image wise exposure and developing so that a multicolor toner image is formed on the front surface; in which a secondary color of the multicolor toner image, which consists of two color toner images, is formed in a manner that the two color toner images are formed by conducting the image wise exposure at a same exposure amount; and the first one of the two color toner images is formed by conducting the image wise exposure at an exposure amount which creates a potential smaller than that of already formed primary color of the multicolor toner image, which consists of single color toner image.

19 Claims, 27 Drawing Sheets

FIG. 18 (a)
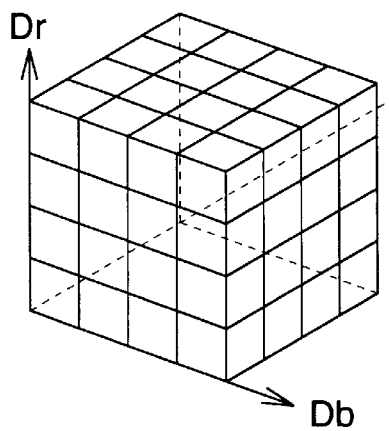
DIVISION OF COLOR
SEPARATION SIGNAL SPACE
FIG. 18 (b)
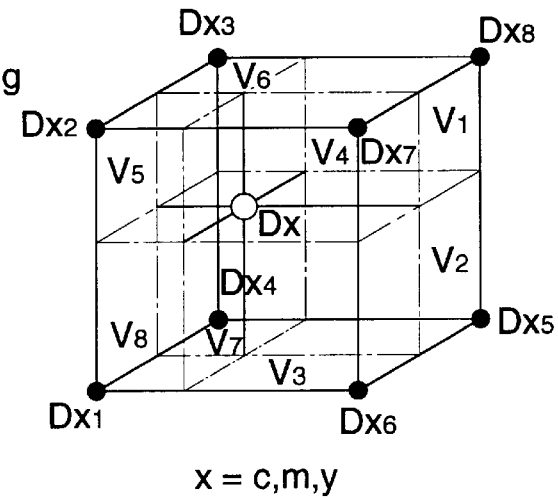
x = c,m,y
8-POINT INTERPOLATION
METHOD
FIG. 18 (c)
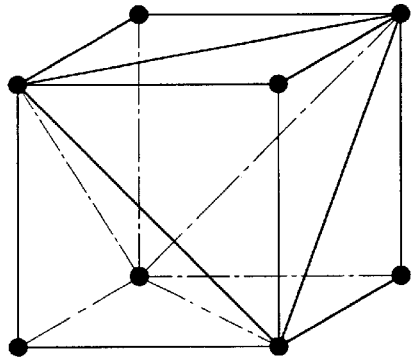 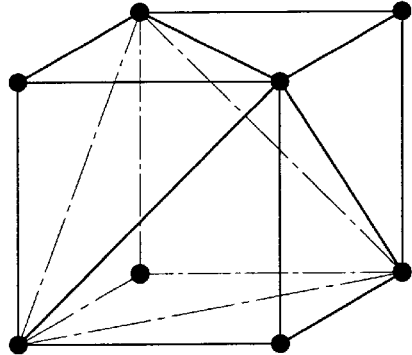
DIVIDING METHOD TO TETRAHEDRON
3-DIMENSIONAL
INTERPOLATION
METHOD

|  |  |  |
|---|---|---|
| m1 | m2 | m3 |
| m4 | m5 | m6 |
| m7 | m8 | m9 |

FIG. 27 (a)

| | | |
|---|---|---|
| m1=226 | m2=251 | m3=8 |
| m4=200 | m5=45 | m6=7 |
| m7=190 | m8=8 | m9=2 |

| | | |
|---|---|---|
| s1=71 | s2=76 | s3=24 |
| s4=65 | s5=32 | s6=24 |
| s7=63 | s8=24 | s9=22 |

COLOR IMAGE FORMING APPARATUS AND METHOD USING COLOR COMPENSATION

BACKGROUND OF THE INVENTION

The present invention relates to an image forming method (hereinafter, this method is simply called KNC), by which a latent image which is color-separated, is formed on an image forming body, multi-color toner images are superimposed on the image forming body, and after that, toner images are transferred onto a recording sheet. More specifically, the present invention relates to a color image forming method by which color reproduction of an edge, fine lines, or isolated points of an image is increased, and to a color image forming apparatus which is used as a printing apparatus, or a copying apparatus, in which this method is adopted.

The KNC process is a process in which multi-color toner images are superimposed on an image forming body by repeating a charging process, an image exposure process, and a reversal development process, and after that, toner images are transferred onto a recording sheet. In the development process, a DC and an AC bias voltage are applied onto each developing sleeve, and the non-contact reversal development is carried out on the image forming body. An adhering condition of toner obtained by the KNC process, is not simply determined only by an exposure which is optically modulated according to image density data. In the case where an external exposure system, in which image exposure means are arranged outside the image forming body, and image exposure is carried out from the outside of the image forming body, is adopted, the following phenomena have relation to the toner adhering condition.

The first phenomenon is one that the next toner hardly adheres onto a solid portion of the toner image because of the shielding property by which the toner layer potential or toner hardly transmits light. This is simply called the average slippage by the structure of the preceding image. The second phenomenon is the deformation of an electrostatic latent image (hereinafter, simply called a latent image), which is produced by the structure of the previously formed toner image, that is, the edge effect which occurs at an edge of an isolated point, an isolated dot-line, letters, and a solid portion, or a halo effect which appears as a false contour phenomenon, when colors are superimposed on each other. The cause of the phenomenon is the same as that of the edge effect, and this phenomenon is one specific to the KNC process by the superimposition. Such a slippage by development is simply called a partial slippage by the structure among images. The third phenomenon is the deformation of a latent image generated by the type of images, without depending on the condition under which no toner image is formed yet on the image forming body, or the structure of the previously formed toner images, that is the edge effect phenomenon specific to the electronic photographic method, and is the slippage between image data and the reproduction image, which is hereinafter simply called the slippage by the structure of the image. Sometimes the edge effect or the halo effect reaches 0.5–2 mm, although also depending on the developing method or characteristics of the photoreceptor layer. In order to suppress such phenomena, conventionally, as disclosed in Japanese Patent Publication Open to Public Inspection No. 218991/1994, or the like, the color reproducibility is increased by the following method, in which the pulse width is modulated at the time of image exposure, so that a toner image is formed well-balanced on the lower layer and the upper layer for each unit of a recording dot, and correction of modulation of the exposure beam is conducted on isolated pixels, a solid portion which is continuous pixels, and edge pixels of the solid portions. Concretely, a correction, in which the first color is weak and the second color is strong, is conducted when the recording dots are superimposed.

FIG. 3 is a graph showing the KNC correction by the external exposure system.

The graph shows the characteristics of the photoreceptor of the image forming body, in which the vertical axis of the graph shows the surface potential of the image forming body, and the horizontal axis of the graph shows the exposure amount.

Further, hereinafter, a color, which is formed with a single color toner such as that of yellow, magenta, cyan and black, is named as "the primary color" and a color, which is formed by a composition of two different primary colors, is named as "the secondary color". The following description will be treated with those names.

The curve a is the photosensitive characteristics under the condition that no toner image is carried on the surface of the image forming body, $E_{1/2}$ is an exposure amount required to decay the initial charging potential $V_0$ to the half value, and this is referred to as the half decay exposure. The exposure amount $E_c$ is an exposure amount to obtain the primary color having the maximum image density, and the exposure amount $E_a$ is an exposure amount of the first color to obtain the secondary color having the maximum image density. The exposure amount $E_a$ is smaller than the exposure amount $E_c$, so that the toner adhering amount of the first color to obtain the secondary color is made almost the same as that of the second and subsequent color.

The curve b is photosensitive characteristics under the condition that the first color toner layer is already carried on the surface of the image forming body in order to obtain the secondary color. The curve b is a curve having a degree of the decay which is less than that of the curve a because of the light shielding property of the toner, and the remaining potential also rises by the previously formed toner layer potential. Accordingly, for example, when the first color image exposure is carried out with the same exposure amount $E_a$ as that of the second color image exposure in order to obtain the secondary color, the latent image potential is not fully lowered as shown in the graph, and is not the same. Thereby, the second color toner image, which has a smaller toner adhering amount and in which color balance is lost, is obtained. In order to correct the loss of the color balance, the second color exposure amount $E_{b1}$ to obtain the secondary color is corrected so as to be larger than the first color exposure amount $E_a$ to obtain the secondary color. The exposure amount $E_{b1}$ is approximately twice $E_a$ or more, and is a large exposure amount which is approximately the same as $E_c$, or more. Thereby, the first color toner layer adhering amount to obtain the secondary color having the maximum density, is made the same as the toner layer adhering amount of the second and subsequent color. This is the basic principle of the KNC correction by the external exposure system, and because the correction amount is large, this is a reason in which the stability of the color image is difficult.

The KNC process, in which the KNC correction is added by the external exposure system, will be described below.

FIG. 4 is diagrams showing the surface potential on the image forming body in the KNC process of the external exposure system.

FIG. 4(a) is a diagram showing the initial charge, and it can be seen that the surface potential of the image forming body is uniformly set to the charging potential. FIG. 4(b) is a diagram showing the exposure process to form the first color latent image, in which $E_c$ shows an exposure amount to obtain the primary color having the maximum image density, and $E_a$ shows the first color exposure amount to obtain the secondary color having the maximum image density. Because $E_a$ is smaller than $E_c$, it can be seen that the latent image potential is higher.

FIG. 4(c) is a diagram showing conditions after the first color developing process, and it can be seen that toner adheres corresponding to the potential difference between the latent image potential and developing bias voltage.

FIG. 4(d) is a diagram showing the surface potential of the image forming body after the second charging process. It can be seen that the charging potential is uniform without depending on the existence of toner.

FIG. 4(e) is a diagram showing the exposure process to form the second color latent image. $E_c$ shows an exposure amount to obtain the primary color having the maximum density, and $E_{b1}$ shows the second color exposure amount to obtain the secondary color having the maximum image density. When $E_{b1}$ is the same as $E_c$ or larger than $E_c$, the influence of the first color toner layer potential, or the light shielding property of toner is corrected, and the second color latent image potential is the same as the first color toner latent image potential.

FIG. 4(f) is a diagram showing conditions after the second color developing process, and toner adheres corresponding to the voltage difference between the latent image potential and the developing bias voltage. That is, it can be seen that the adhering amount of the first color toner layer to obtain the secondary color and that of the toner layer after the second and subsequent color are corrected by the exposure amount so that these adhering amounts are the same.

Further, the same exposure amount correction is also conducted on the primary color and secondary color ranges, which have intermediate image density, ranging from the low to intermediate density, according to the potential characteristics shown in FIGS. 3 and 4.

However, when the KNC process, in which image exposure is conducted from the inside, is carried out, there is no influence of light shielding of the previous toner image, or spread of the beam diameter, caused by light scattering by the toner image, as compared to the KNC process in which the external exposure system is adopted. Concretely, the image exposure is conducted without being influenced by the previous toner image on the above-described points, however, on the other hand, the remaining potential is increased by the toner layer potential. Although the first phenomenon or the second phenomenon is decreased because no light absorption or light scattering occurs, the KNC correction by the conventional external exposure system can not simply be applied because the toner layer exists, and therefore, the correction specific to the internal exposure system is necessary.

Furthermore, proposals in the conventional external exposure system are for binary image data, and are limited to the two color superimposition. The proposals highly regard adjoining pixel information of the image, and can not increase the quality of color reproduction of the edge, fine line, and isolated point, including the case of multi-value image data. Further, the proposals do not meet the case of the full-color image in which 3–4 colors are superimposed. This means the following: wide range correction is essential because the edge effect range is extended to about 1 mm; it is necessary that the correction level is highly accurate for multi-value color image data, and the conventional correction by adjoining pixel information is not adequate; and thereby, the correction is necessary which meets the structure or extension of the image.

SUMMARY OF THE INVENTION

In view of the foregoing problems, the first object of the present invention is to provide a color image forming method to increase the color reproducibility in the KNC process in which image exposure is carried out from the inside.

In view of the foregoing problems, the second object of the present invention is to provide a color image forming apparatus to increase the color reproducibility of the edge, fine line, and isolated point, by correcting image data by considering the image density distribution, that is, by newly making recording image data for each color, and by optically modulating and recording it, when toner images are superimposed according to multi-value color image density data.

Means to attain the above objects are as follows.

(1) A color image forming method by which an image forming body is charged, image exposure is conducted from the rear surface of the image forming body, and toner images are superimposed and formed by repeating the reversal development, the color image forming method is characterized in that the first and second color exposure amounts, when the secondary color having the maximum density is formed, is less than the exposure amount of the primary color toner layers at the maximum density.

(2) A color image forming method by which an image forming body is charged, image exposure is conducted from the rear surface of the image forming body, and toner images are superimposed and formed by repeating the reversal development, the color image forming method is characterized in that the first color exposure amount, when the secondary color having the maximum density is formed, is almost the same as the second color exposure amount, and is not larger than the exposure amount when the primary color having the maximum density is formed, and further, it is more than a half decay exposure amount $E_{1/2}$ of the image forming body, and not larger than twice the amount.

(3) The color image forming method of either (1) or (2), which is characterized in that the second color is corrected 5–50% more than the first color in the secondary color image exposure amount having the maximum density.

(4) The color image forming method of any of (1)–(3), which is characterized in that the second color of the solid portion is corrected 5–30% more than the first color in the secondary color image exposure amount having the maximum density.

(5) The color image forming method of any of (1)–(4), which is characterized in that the second color of the isolated point is corrected 5–50% more than the first color in the secondary color image exposure amount having the maximum density.

(6) The color image forming method of any of (1)–(5), which is characterized in that the fist color and second color image exposure amounts of the secondary color having the maximum density is set smaller than the primary color having the maximum density.

(7) The color image forming method of any of (1)–(6), which is characterized in that the correction of the second color image exposure amount is increased corresponding to an increase of the image exposure amount.

(8) A color image forming apparatus in which an image forming body is charged, image exposure is conducted from the rear surface of the image forming body, and toner images are superimposed and formed by repeating the reversal development, the color image forming apparatus is characterized in that exposure means are arranged so that the exposure is conducted from the inside of the image forming body, the first and second color exposure amounts from the exposure means, when the secondary color having the maximum density is formed, is less than the exposure amount of the primary color toner layers at the maximum density.

(9) A color image forming apparatus in which an image forming body is charged, image exposure is conducted from the rear surface of the image forming body, and toner images are superimposed and formed by repeating the reversal development, the color image forming apparatus is characterized in that exposure means are arranged so that the exposure is conducted from the inside of the image forming body, the first color exposure amount from the exposure means, when the secondary color having the maximum density is formed, is almost the same as the second color exposure amount, and the first color exposure amount is not larger than the exposure amount when the primary color having the maximum density is formed, and is larger than the half decay exposure amount $E_{1/2}$ of the image forming body, and not larger than twice the amount.

(10) The color image forming apparatus of either (8) or (9), in which the image exposure for each color is conducted according to multi-value recording image data so that an exposure beam is optically modulated for each recording dot in which recording image data is corrected by image density and image density distribution data, and the optical modulation according to recording image data is conducted by pulse width modulation or intensity modulation.

(11) The color image forming apparatus of (10), in which a correcting section to form multi-value recording image data, used for image exposure for each color, has the first correcting section to correct an average displacement among color component images, and the second correcting section to correct a local displacement due to the structure among color component images.

(12) The color image forming apparatus of (11), in which the first correcting section and the second correcting section correspond to either pulse width modulation or intensity modulation.

(13) The color image forming apparatus of any of (8)–(11), in which correction of the second color image exposure amount is increased corresponding to an increase of the image exposure amount.

BRIEF DESCRIPTION OF THE DRAWINGS

FIGS. 8(a) through 8(h) are time charts showing the operation of the scanning circuit.

FIGS. 18(a) through 18(c) are diagrams showing color correction processing by a 3-dimension interpolation method.

FIGS. 27(a) and 27(b) are diagrams showing an example when the target pixel m5 is divided into 3×3, and P=0.5.

DETAILED DESCRIPTION OF THE INVENTION

EXAMPLE 1

Initially, a general mechanical structure in a color image forming apparatus 400 of an example of the present invention will be described below.

Figure 1:
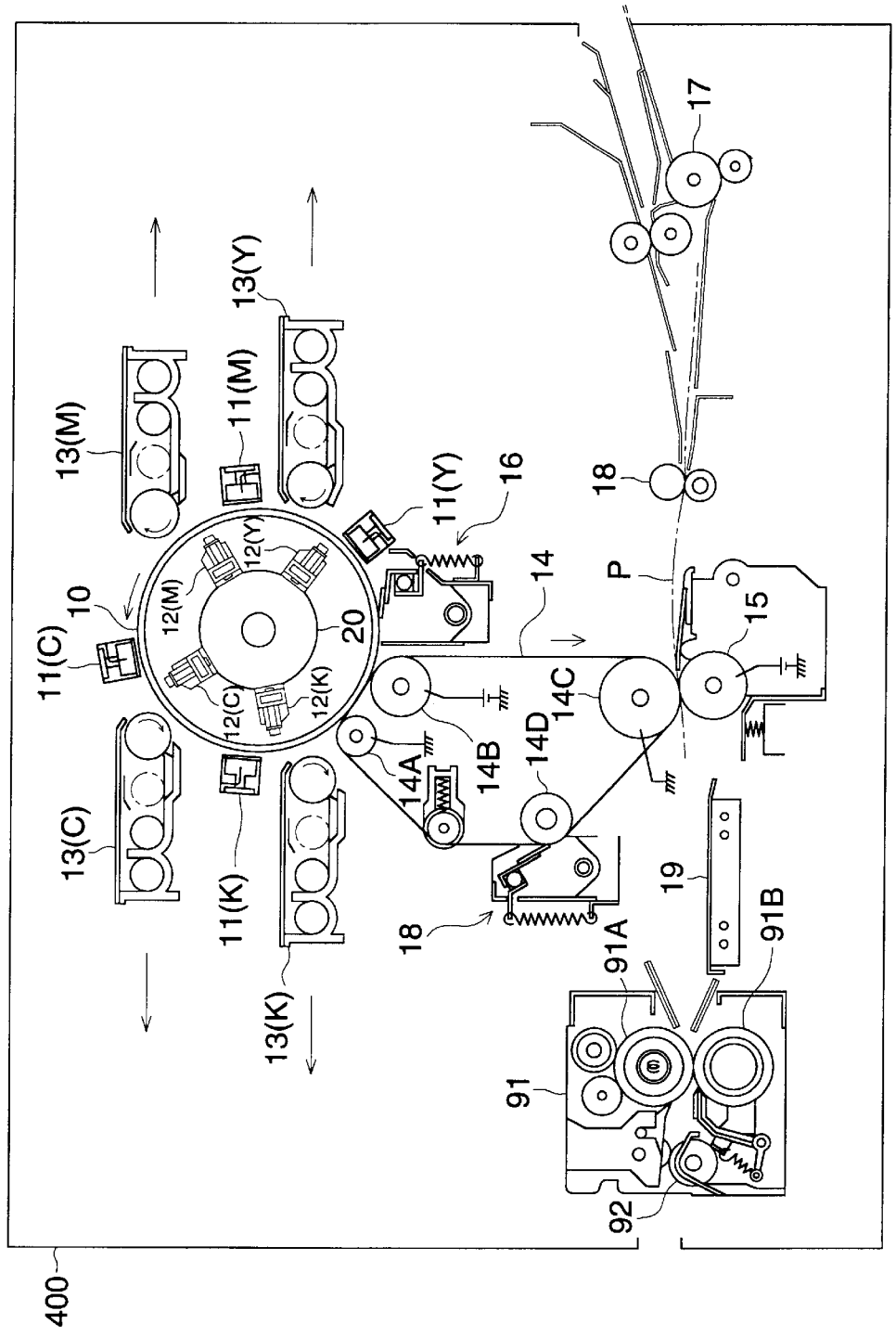
FIG. 1 is a structural sectional view of a color image forming apparatus.
Figure 2:
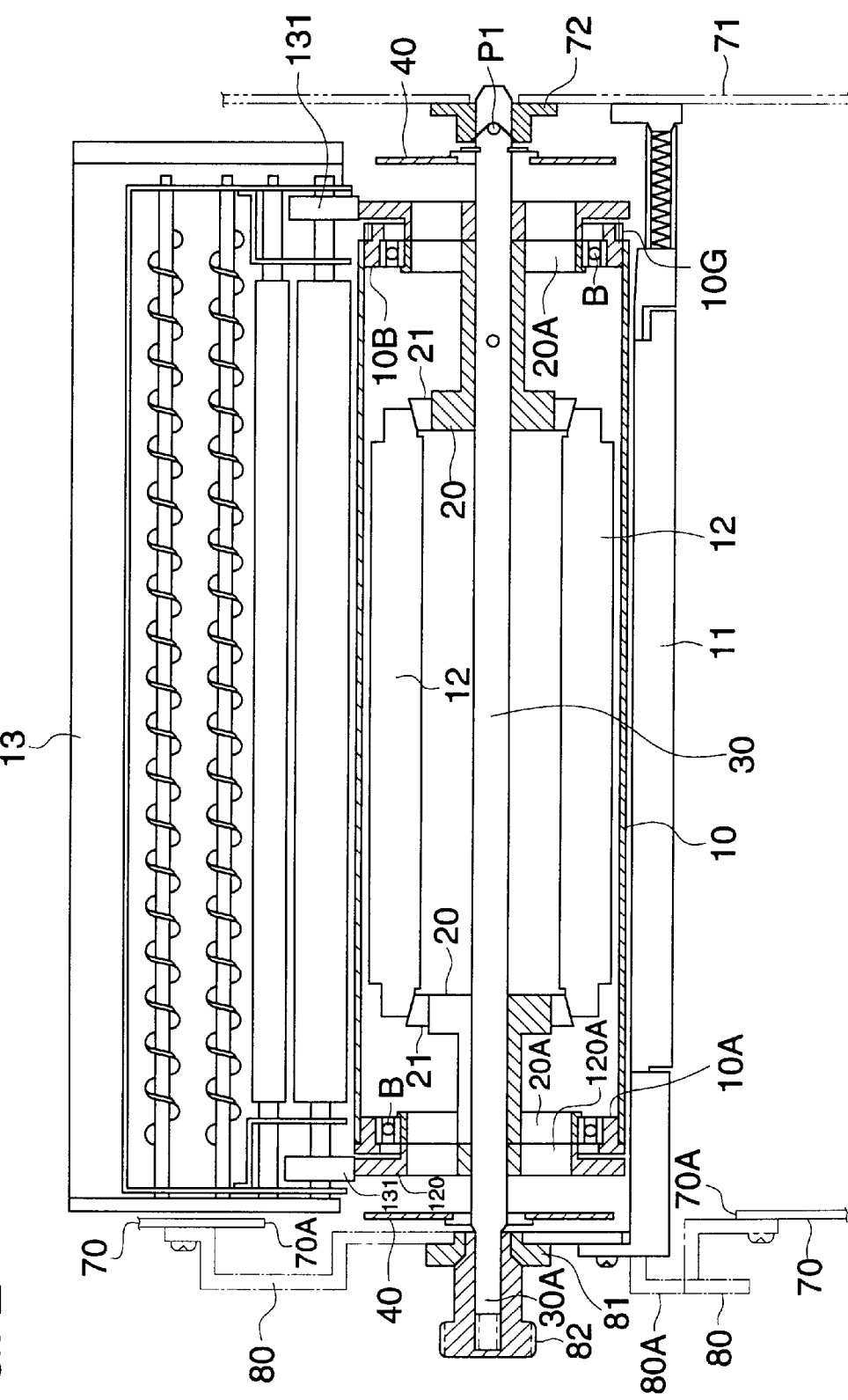
FIG. 2 is a sectional view showing the supporting structure of an image forming body.

Referring to FIGS. 1 and 2, the structure of an example of the color image forming apparatus of the present invention will be described. FIG. 1 is a structural sectional view of the color image forming apparatus, and FIG. 2 is a sectional view showing a supporting structure of an image forming body.

A color image forming apparatus 400 of the present invention is structured as follows. In order to solve an insufficient space problem around the peripheral surface of an image forming body 10 a base body of the image forming body 10 is transparent; exposure optical systems 12Y, 12M, 12C and 12K are provided on a cylindrical supporting member 20, and housed inside the base body of the image forming body 10; and image exposure is conducted from the inside of the image forming body 10. By using an intermediate transfer belt 14, a conveyance surface of a recording sheet, conveyed from the tangential direction to a transfer area, is set at a position separated from the peripheral surface of the image forming body 10; in order to maintain a gap between the image forming means and the image forming body 10, contact rollers provided on developing devices 13Y, 13M, 13C and 13K, are in contact with an end portion of the image forming body 10; and roller members provided at end portions of chargers 11Y, 11M, 11C and 11K, are in contact with the image forming body 10, so that the gap is maintained. The supporting structure of chargers 11Y, 11M, 11C, 11K, exposure optical systems 12Y, 12M, 12C, 12K, developing devices 13Y, 13M, 13C, 13K, an intermediate transfer belt 14, and a transfer roller 15, etc., will be described below.

The image forming body 10, chargers 11Y, 11M, 11C, 11K, developing devices 13Y, 13M, 13C, 13K, and a cleaning device 19 are accommodated in a cartridge (not shown), and are integrally housed in the apparatus main body.

On the other hand, exposure optical systems 12Y, 12M, 12C, and 12K are also integrated using a supporting member 20 as a supporting body, supported and accommodated in the cartridge, and attached to and detached from the apparatus main body together with the image forming body 10. Further, toner containers (not shown) are accommodated in the upper portion of the cartridge, and are connected to developing devices 13Y, 13M, 13C, and 13K, which are toner supplying objects, through respective toner supply pipes (not shown).

Exposure optical systems 12Y, 12M, 12C, 12K are accommodated inside the base body of the image forming body 10, as shown in FIG. 2, by being adhered onto both end portions of the front and back supporting members which are fixed onto a rotation support shaft 30, by being adjusted through edge-like adhering members 21 so that the distance to the photoreceptor surface is in a predetermined positional relationship. Flange members 10A and 10B provided on both end portions of the image forming body 10 are rotatably supported respectively by the supporting members 20 through bearings B, and the image forming body 10 is rotated around the rotation support shaft 30, which is under fixed condition, by the drive of a gear 10G provided on the flange member 10B.

As described above, the rotation support member 30, integrally supporting the image forming body 10 and exposure optical systems 12Y, 12M, 12C and 12K, is supported by bearings between symmetrical front and back drum support plates 40, which are formed into C-shape and integrally connected.

Contact reference members are disk-shaped members, and fixed concentrically with the image forming body onto left and right supporting members 20 by screws (not shown) through the rotation support shaft 30, under the condition that the center axis of the members is the same as that of the image forming body 10. A contact roller 131 of each developing device 13 comes into contact with a contact surface (not shown) of the contact reference member, provided concentrically with the image forming body 10, and the developing device 13 is positioned on the same shaft as the image forming body 10. The contact roller 131 is a gap maintaining member housing a bearing (not shown) in shafts of both end portions of a developing sleeve of the developing device 13. For example, a 3 mm thick and outer diameter 20 mm member is used as the contact roller 131, the contact roller 131 is supported by a bearing (not shown) provided in a rotation shaft of the developing device 13, and is provided so that it is independently rotated from the developing sleeve. By the contact roller 131, which is brought into contact with the contact reference member, the developing sleeve is maintained to be non-contact with the image forming body 10, with a predetermined gap, for example, 300–600 $\mu$m, and the developing device 13 is mounted.

The contact reference member is provided with contact surfaces for chargers 11Y, 11M, 11C, 11K, the cleaning device 16, or the intermediate transfer belt 14. Gap maintaining members are respectively provided for these devices in the same way as the positioning of developing devices 13Y, 13M, 13C and 13K. After the chargers 11Y, 11M, 11C, 11K, cleaning device 16 and intermediate transfer belt 14, etc., have been mounted, the gap maintaining members, provided on the chargers 11Y, 11M, 11C, 11K, cleaning device 16 and intermediate transfer belt 14, etc., are brought into contact with the contact reference member, and these members are concentrically positioned with the image forming body 10. Due to this structure, when gaps for image forming means such as developing devices 13Y, 13M, 13C, 13K, chargers 11Y, 11M, 11C, 11K, the cleaning device 16, and intermediate transfer belt 14, are maintained with respect to the image forming body 10, these gap maintaining members are positioned with respect to the contact reference member, and the image forming body 10 is not directly pressed by these image forming means, so that the image forming body 10 is not deformed or damaged.

When a suspending member (not shown) is inserted into and engaged with a guide member (not shown) provided in the apparatus main body, and the drum support plates 40 are suspended at the front and back connecting portions, the image forming body 10, and exposure optical systems 12Y, 12M, 12C, 12K, which are maintained on the rotation support shaft 30, are arranged at almost setting positions. When the rotation support shafy 30 is inserted to a normal position, a shaft end portion 30B protruding from the back drum support plate 40 is engaged with a bushing 72, provided on a rear side plate 71 as a apparatus base plate; and a shaft end portion 30A protruding from the front drum support plate 40 is supported by a screw member 82, which is engaged under tapered condition with a bushing 81, provided on a drum support base plate 80, and thereby, the image forming body 10 is accurately regulated to a normal setting position, and the gear 10G is engaged with a drive-side gear. On the other hand, when a penetrating pin P1, further provided at a shaft end portion 30B, is engaged with a groove having a V-shaped section formed on the bushing 72, exposure optical systems 12Y, 12M, 12C and 12K are accurately regulated to a predetermined angle position with respect to the apparatus main body, and is fixed.

Upper and lower reference holes H1 are engaged with a pair of reference pins P2, provided on a front side plate 70 which serves as a front apparatus base plate, and an attachment position of the drum supporting base plate 80 is determined, and the drum supporting base plate 80 is fixed to the front side plate 70 by a plurality of screws. Further, a plurality of windows 80A (openings) are formed, bar-like chargers 11Y, 11M, 11C, 11K are inserted from the outside of the drum supporting base plate 80, and are set to a predetermined interval position with respect to the image forming body 10, and fixed by screws and supported under the condition that electrodes are connected.

The supporting structure of image forming members are described above. Next, the outline structure of each image forming member will be described.

The image forming body 10 is structured as follows: a transparent conductive layer, and a photoreceptor layer such as an organic photoreceptor (OPC), an a-Si. etc., are provided on the outer periphery of a cylindrical base body formed of a transparent member of glass or transparent acrylic resin, etc.

The image forming body 10 is provided inside with a cylindrical transparent resin base body formed of a transparent member of, for example, glass or transparent acrylic resin, and a transparent conductive layer and an organic photoreceptor layer (OPC) are formed on the outer periphery of the base body. The image forming body 10 is rotated counterclockwise, as shown by an arrow in FIG. 1, while being electrically grounded.

In the present example, the transparent base body may have only an amount of exposure, which can form an appropriate contrast on a light conductive layer of the image forming body 10. Accordingly, it is not necessary that the light transparency factor of a transparent base body of the image forming body 10 be 100%, but may have a characteristic in which some amount of light is absorbed at the time of transmission of the exposure beam. As light transmissive base body materials, acrylic resins, specifically, polymers incorporating a methyl methacrylate monomer, are excellent for the transparency, strength, accuracy, surface property, etc., and are preferably used. Further, any type of light transmissive resins such as fluorine, polyester, polycarbonate, polyethylene terephthalate, etc., which are used for general optical members, may be used.

The material may even be colored if it still has light permeability with respect to the exposure light beams. The refractive index of these resins is approximately 1.5. As film forming methods of a light conductive layer, a vacuum deposition method, an activated reaction deposition method, any type of spattering method, any type of CVD method, etc., can be used, and indium, tin oxide (ITO), lead oxide, indium oxide, copper iodide, or a metallic film, in which light permeability is still maintained, and which is formed of Au, Ag, Ni, Al, etc., can be used. Any dip coating method, any spray coating method, etc., can be used, and conductive resin, formed of fine particles of the metal, and binder resin, is used. Further, as light conductive layers, any type of organic photoreceptor layer (OPC) can be used.

Incidentally, after plastic material monomers are synthesized, and catalyst to polymerize is added to it, the solution is injected into a cylindrical die, the die is hermetically shielded by side plates and fixed, it is rotated at high speed, and appropriately heated, thereby, uniform polymerization is promoted. After polymerization, it is cooled, an obtained transparent resin base body is taken out of the die and is cut. If necessary, through a finishing process, a transparent resin base body for the image forming body of the image forming apparatus is produced (Centrifugal polymerization method).

As materials of a transparent resin base body which is formed by the centrifugal polymerization, and which is formed of transparent plastic, as described above, a material polymerized using a methyl methacrylate monomer, is the best for the transparency, strength, accuracy, surface property, and other than that, polyethyl methacrylate, polybutyl methacrylate, polyethyl acrylate, polybutyl acrylate, polystyrene, polyimide, polyester, polyvinyl chloride, etc., or their copolymers can also be used. In the centrifugal polymerization method, the deviation from roundness is determined by the molding die, so that a highly accurate base body can be obtained. Further, the deviation of thickness changes by the non-uniform rotation at polymerization, or by a heating condition at polymerization.

By using the cylindrical plastic transparent resin base body produced by the above-described production method, an image forming body which has a uniform thickness, and which is excellent for the deviation from cylindricity, and deviation from roundness, can be provided.

Chargers 11Y, 11M, 11C and 11K are charging means used for image forming processes for yellow, magenta, cyan, and black, and a charging operation is conducted by corona discharge by a grid, which is maintained at a predetermined potential with respect to the organic photoreceptor layer of the image forming body 10, and a wire electrode, and a uniform potential is applied onto the image forming body 10.

Exposure optical systems 12Y, 12M, 12C, 12K are image exposure means composed of light emitting elements such as LED, FL, EL, PL, etc., which are aligned in the axial direction of the image forming body 10, and image forming elements such as Selfoc lenses, etc. Each color image signal, read by an image reading apparatus which is separately provided from the image forming apparatus, is successively read from a memory, and inputted as an electric signal into the exposure optical systems 12Y, 12M, 12C, and 12K. In this connection, the exposure optical systems 12Y, 12M, 12C, 12K can be composed of a combination of optical shutter members such as LCD, LISA, PLZT, etc., as light emitting elements, and of an image forming element such as a Selfoc lens, etc.

Incidentally, temperature stabilization and prevention of temperature rise inside the image forming body 10 due to heat generation of exposure optical systems 12Y–12K, are controlled to a degree in which no problem occurs, by taking the following countermeasures: an excellent heat conductive material is used for the supporting member 20; a heater is used when the inside temperature is low; and heat is radiated outside through a heat pipe when the inside temperature is high.

Developing devices 13Y, 13M, 13C, 13K are developing means in which yellow, magenta, cyan and black developers are respectively accommodated, and are respectively provided with a developing sleeve which is rotated in the same direction as the image forming body 10 while maintaining a predetermined gap with respect to the peripheral surface of the image forming body 10. Developing devices 13Y, 13M, 13C, 13K are respectively provided with a pressing device (not shown), and thereby, a contact member provided on a shaft end of the developing sleeve is brought into pressure contact with the outside of an image formation area on the peripheral surface of the image forming body 10, and a predetermined amount (0.2 mm–1.0 mm) of gap is set between the developing sleeve and the peripheral surface of the image forming body 10.

Developing devices 13Y, 13M, 13C, and 13K, reversal-develop an electrostatic latent image, formed on the image forming body 10 by a charge by chargers 11Y, 11M, 11C, 11K, and by image exposure by exposure optical systems 12Y, 12M, 12C, 12K, by a non-contact developing method under the condition that developing bias voltage is applied.

The intermediate transfer belt 14 is a 0.5–2 mm thick endless rubber belt, and has the 2 layer construction in which fluorine coating with a resistance value of $10^{10}$–$10^{16}$ Ω.cm, and 5–50 μm thickness, as a toner filming prevention layer, is conducted outside the rubber belt base body, which is a semi-conductive base body formed of silicon rubber or urethane rubber with a resistance value of $10^8$–$10^{12}$ Ω.cm. This layer is also preferably semi-conductive. Instead of rubber belt base body, 0.1–0.5 mm semi-conductive polyester, polystyrene, polyethylene, polyethylene terephthalate, etc., can be used. The intermediate transfer belt 14 is wound around rollers 14A, 14B, 14C, and 14D, and is synchronized with the peripheral speed of the image forming body 10, circulated clockwise and conveyed by a power transmitted to the roller 14D.

The belt surface of the intermediate transfer belt 14 between the roller 14A and roller 14B is in contact with the peripheral surface of the image forming body 10. On the other hand, the belt surface of the outer periphery of the roller 14C is in contact with the transfer roller 15, which is a transfer member, and a toner image transfer area is formed at respective contact points.

By being provided with the above structure, the intermediate transfer belt 14 successively transfers a color toner image, adhering onto the peripheral surface of the image forming body 10, onto the peripheral surface side of the intermediate transfer belt 14, initially at the contact point between the intermediate transfer belt 14 and the image forming body 10, by application of bias voltage with reverse polarity as toner to the roller 14B. That is, the color toner image on the image forming body 10 is conveyed to the transfer area by the guide of the grounded roller 14A, without scattering toner, and the color toner image on the image forming body 10 is efficiently transferred onto the intermediate transfer belt 14 side by application of bias voltage of 1–2 kV to the roller 14B.

Herein, the KNC correction in the internal exposure system will be described.

Figure 5:
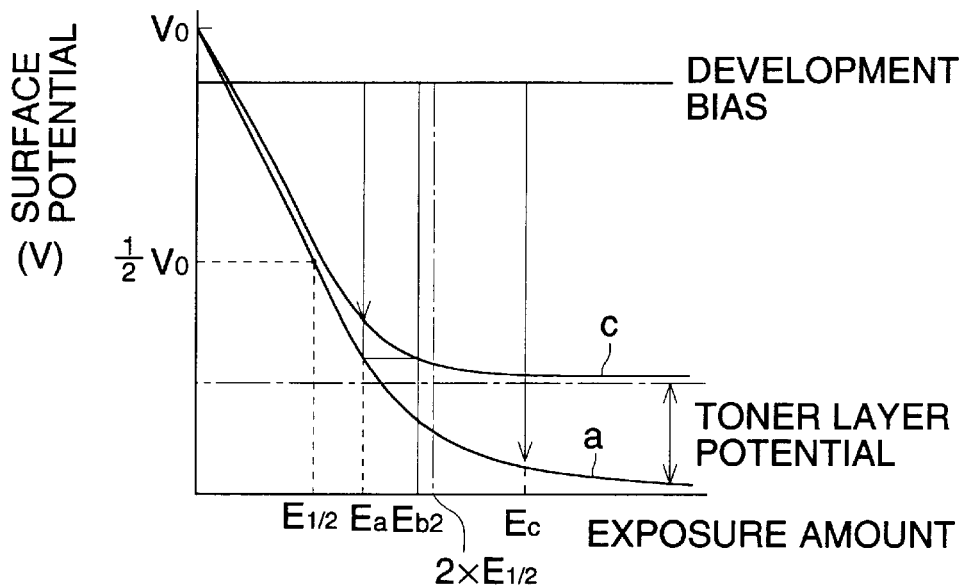
FIG. 5 is a graph showing the KNC correction by an internal exposure system.

FIG. 5 is a graph showing the KNC correction by the internal exposure system.

The graph shows photosensitive characteristics of the image forming body 10, the vertical axis of the graph shows the surface potential of the image forming body 10, and the horizontal axis of the graph shows exposure amount.

The curve a is a photosensitive characteristics under the condition that no toner image is carried on the surface of the image forming body 10, and $E_{1/2}$ is an exposure amount necessary to decay the initial charging potential $V_0$ to the half value, which is called the half decay exposure amount. The exposure amount $E_c$ is an exposure amount to obtain the primary color having the maximum image density, and the exposure amount $E_a$ is the first color exposure amount to obtain the secondary color having the maximum image density. In a color image forming method by which the image forming body 10 is charged, the image exposure is conducted from the rear surface of the image forming body 10, the reversal development is repeated, and the toner image are is formed by superimposition, the first color exposure amount, when the secondary color having the maximum density is formed, is approximately equal to the second color exposure amount, and the secondary color exposure amount is smaller than the primary color exposure amount, thereby, the first color adhering amount can be the same as the second color adhering amount also in the secondary color having the maximum image density. In the present example, the exposure amount $E_c$ is larger than twice the half decay exposure amount $E_{1/2}$. Normally, this value is preferably 2–3 times. The exposure amount $E_a$ will be described referring to FIG. 5. The $E_a$ to obtain the secondary color having the maximum density is smaller than the exposure amount $E_c$ so that the toner adhering amount for the first color is approximately the same as that for the second color and after it. In a color image forming method by which the image forming body 10 is charged, the image exposure is conducted from the rear surface of the image forming body 10, the reversal development is repeated, and the toner image are is formed by superimposition, the first color exposure amount when the secondary color having the maximum density is formed, is approximately the same as the second color exposure amount, and is smaller than the exposure amount when the primary color having the maximum density is formed, and is larger than the half decay exposure amount $E_{1/2}$ of the image forming body 10, and smaller than twice the amount $E_{1/2}$.

The curve c shows photosensitive characteristics under the condition that a toner layer is carried on the image forming body 10 to obtain the secondary color. The curve b, in which the influence of light shielding property of toner is removed by adoption of the internal exposure system, is almost the same as the curve a, and is a curve in which attenuation is slightly delayed. From this fact, in the area in which the exposure amount is smaller, that is, the second color toner adhesion is smaller, the first color exposure amounts may be almost the same as the second color exposure amount, or the second color exposure amount may be slightly larger than the first color exposure amount. On the other hand, it can be seen that, as the exposure amount is increased, deviation of the light attenuation curve is increased, or the influence of the remaining potential is increased due to the previously formed toner layer potential. Accordingly, for example, in order to obtain the secondary color having the lower image density, the first color image exposure amount is almost the same as the second color image exposure amount, however, in order to obtain the secondary color having the maximum image density, the second color exposure amount is corrected to be larger than the exposure amount of the low image density portion. From this fact, when the secondary color having the maximum image density is formed, it is necessary that the second color exposure amount $E_{b2}$ is corrected to be larger than in the case of the low density portion with respect to the first color exposure amount $E_a$, and preferably corrected to be 5–50% larger. By this correction, as shown by the graph, the latent image potential can be the same as that of the first color, and thereby, the adhesion amount of the first color toner layer, to obtain the secondary color, can be the same as that of the second and subsequent color toner layer.

Further, in order to maintain the quality of the secondary color even under the influence of the first color toner image potential and the second color latent image potential due to the toner layer potential or edge effect, the second color is corrected 5–50% larger than the first color in the image exposure amount of the secondary color having the maximum density. It is preferable that the second color is corrected 5–30% larger than the first color in the solid portion, and the second color is corrected 10–50% larger than the first color in the isolated point, in the image exposure amount of the secondary color having the maximum density. The above correction amount is smaller with respect to the low density.

A color image forming methods by which an image forming body 10 is charged, image exposure is conducted from the rear surface of the image forming body 10, and toner images are superimposed and formed by repeating the reversal development, the color image forming method is characterized in that the first color exposure amount, when the secondary color having the maximum density is formed, is almost the same as the second color exposure amount, and the secondary color exposure amount is smaller than the primary color exposure amount.

The first color image exposure amount $E_a$ to obtain the secondary color, and the second color image exposure amount $E_{b2}$ to obtain the secondary color are set to be larger than the half decay exposure amount $E_{1/2}$, and smaller than twice the half decay exposure amount $E_{1/2}$. When these exposure amounts are not larger than the half decay exposure amount $E_{1/2}$, it is difficult to obtain a sufficient image density, and when larger than twice the half decay exposure amount $E_{1/2}$, it is difficult to control the adhering amounts of toner layers of a plurality of colors to be equal.

Because of the rear surface exposure, it is preferable in the exposure amount correction that the secondary exposure amounts $E_a$, $E_{b2}$ are set to be smaller than, at least, the primary color exposure amount $E_c$. The first color and second color image exposure amounts of the secondary color having the maximum density are set to be smaller than that of the primary color having the maximum density.

When the image density of the secondary color is smaller, the second color correction amount is smaller because the difference between the first and second color potential characteristics is small as shown in FIG. 5. That is, it is preferable that the second color correction amount is larger as the image density is increased. Further, it is preferable that this correction is larger as the first color image density is increased.

Next, referring to FIG. 6, a color image forming process in the color image forming apparatus of the present example will be described.

FIG. 6 is a diagram showing the KNC process of the internal exposure system.

FIG. 6(*a*) is a diagram showing the initial charge. FIG. 6(*b*) is a diagram showing an exposure process to form the first color latent image. FIG. 6(*c*) is a diagram showing a condition after the first color developing process. FIG. 6(*d*) is a diagram showing the surface potential of the image forming body 10 after the second charging process. FIG. 6(*e*) is a diagram showing an exposure process to form the second color latent image. FIG. 6(*f*) is a diagram showing a condition after the second color developing process.

The basic process of the KNC process of the present example is as follows. After the image forming body 10 has been uniformly charged, a dot-like electrostatic latent image is formed on the image forming body 10 by spot light, which is pulse-width modulated according to a modulation signal obtained by D/A conversion of multi-value digital image density data from a computer or a scanner; and the latent image is reversal-developed by toner and a dot-like toner image is formed. Charging, exposure, and reversal development processes, which are the basic process, are repeated, color toner images are formed on the image forming body 10 by superimposition, and after these color toner images are transferred onto a recording sheet, the recording sheet is separated from the image forming body 10, fixed, and a color image is obtained.

In an image reading apparatus separately provided from the image forming apparatus, image data obtained when a document image is read by an image pick-up element, or image data edited by a computer is processed, and temporarily stored in a memory as an image signal for each color of Y, M, C, K. When image recording starts, the image forming body 10 is rotated clockwise by the start of an image forming body drive motor, and simultaneously, application of potential voltage starts onto the image forming body 10 by the charging operation of the charger 11Y (refer to FIG. 6(*a*)).

The spot light, modulated by yellow data (for example, 8-bit digital image density data), is irradiated in the exposure optical system 12Y. In FIG. 6(*b*), $E_c$ shows an exposure amount to obtain the primary color having the maximum image density, and $E_a$ shows a first color exposure amount to obtain the secondary color having the maximum image density. Because $E_a$ is smaller than $E_c$, it can be seen that the latent image potential is high. Of course, in the intermediate density, the exposure amount is smaller than $E_a$ and $E_c$.

In the developing device 13Y, the developing bias voltage, composed of DC and AC voltage, is applied to the developing sleeve, jumping development is carried out by 1 component or 2 component developer accommodated in the developing device, and non-contact reversal development is conducted on the latent image, shown in FIG. 6(*b*), formed on the image forming body 10 in which the transparent conductive layer is grounded, and thereby, the yellow toner image is formed corresponding to the rotation of the image forming body 10. From FIG. 6(*c*), it can be seen that toner is adhered corresponding to the voltage difference between the latent image potential voltage and the developing bias voltage.

FIG. 5(*d*) is a diagram showing the surface potential of the image forming body after the second charging process. It can be seen that the charging potential is uniform, not depending on the existence of toner.

Next, the spot light, modulated by magenta data (8-bit digital density data), is irradiated on the image forming body 10 and an electrostatic latent image is formed. In FIG. 6(*e*), $E_c$ shows the exposure amount to obtain the primary color having the maximum image density, and $E_{b2}$ shows the second color exposure amount to obtain the secondary color having the maximum image density. The electrostatic latent image, shown in FIG. 6(*e*), is non-contact reversal-developed by the developing device 13M, and thereby, the magenta toner image is successively superimposed on the yellow toner image. As shown in FIG. 6(*f*), it can be seen that toner is adhered corresponding to the voltage difference between the latent image potential voltage and the developing bias voltage. That is, the first color toner layer adhesion amount to obtain the secondary color, and the second color and subsequent toner layer adhesion amount are equal.

In the same process as described above by referring to FIGS. 6(*d*)–6(*f*), the latent image is formed by the charger 11C and the exposure optical system 12C, and successively developed by the developing device 13C. Thereby, the third toner image (the cyan toner image) is formed, and a 3-color toner image, successively laminated on the image forming body 10, is formed.

Finally, the black (K) toner image corresponding to the 4th color signal is formed by successive superimposition by the charger 11K, exposure optical system 12Y, and developing device 13K, and a color toner image is formed on the peripheral surface of the image forming body 10 during a single rotation. The toner image for each color is successively superimposed, and 3–4 color toner images are formed in some image.

A recording sheet is conveyed by an operation of a feed roller 17 of a sheet feed cassette (not shown), and fed to a timing roller 18, and is sent to a transfer area of the transfer roller 15 in timed relationship with conveyance of a color toner image on the intermediate transfer belt 14.

The transfer roller 15 is rotated counterclockwise in timed relationship with the peripheral speed of the intermediate transfer belt 14. Thus fed recording sheet is brought into close contact with the color toner image on the intermediate transfer belt 14 in the transfer area formed by a nip portion between the transfer roller 15 and the grounded roller 14C. The color toner image is successively transferred onto the recording sheet, when 1–2 kV bias voltage with the reverse polarity to toner is applied onto the transfer roller 15.

The recording sheet onto which the color toner image has been transferred, is discharged, conveyed to a fixing device 91 through a conveyance plate 19, conveyed being nipped between a heat roller 91A and pressure contact roller 91B and heated, and after toner is fused and fixed, the recording sheet is delivered outside the apparatus through a sheet delivery roller 92.

A cleaning device 16 and an intermediate transfer belt cleaning device 18 are respectively provided on the image forming body 10 and the intermediate transfer belt 14, and each blade is always in pressure contact with the corresponding device, so that remaining adhered toner is removed, and the peripheral surface is always kept clean.

The image exposure onto the photoreceptor layer of the image forming body 10 by the exposure optical systems 12Y, 12M, 12C and 12K, is conducted from the inside of the image forming body 10 trough the transparent base body. Accordingly, the exposure for the image corresponding to the second, third, and forth color signals is conducted under the condition that the previously formed toner image is not transmitted, so that the electrostatic latent image, equal to the image corresponding to the first color signal, can be formed.

The color image forming method of the present example can increase the color reproducibility by color correction appropriate to the KNC process, in which, as described above, the exposure optical systems 12Y, 12M, 12C, 12K are located in the image forming body 10, the photoreceptor of the transparent base body is used, and the image exposure is conducted from the inside of the image forming base body 10.

EXAMPLE 2

Next, an example in which the present invention is applied to a binary recording printer, will be described.

In binary recording, color recording is conducted by 7 colors in which a recording dot is composed of the primary color of Y, M, C, and the secondary color of B, G, R.

When red (R) is reproduced by the color toner superimposition system, it is necessary that the adhering amount of magenta toner and that of other color toners are adjusted to be equal, and a desired color image is obtained by changing each exposure amount and adjusting a mixing ratio by color toner superimposition.

Further, in order to increase the image quality, it is effective that, when charging and image exposure are conducted on the first color toner, exposure for the second color is conducted by considering the influence of the first color toner layer.

In the color image forming apparatus of the present example, charging, image exposure, and developing for each color are successively conducted during a single rotation of one image forming body 10, and thereby, a color image is formed. By using the KNC process in which the exposure optical system is located in the image forming body, the transparent base body photoreceptor is used, and image exposure is conducted from the inside of the image forming body, the influence of light shielding by the previous toner image, or spread of a beam diameter due to light scattering by the toner image, can be eliminated, so that the superimposition property can be increased.

Concretely describing, different from the external exposure system, the feature of the internal exposure system is color correction in which correction of optical absorption or light scattering is not included in the low density portion, and the toner layer potential is corrected in the high density portion. Thereby, correction by the KNC process is changed from the external exposure system, however, its degree is decreased, so that more stable color reproduction can be carried out.

The mechanical structure of the color image forming apparatus in the present example is the same as that described by referring to FIGS. 1 and 2, and therefore, detailed description will be omitted.

On the other hand, the color image forming apparatus in the present example is a system in which an image is formed during a single rotation of the image forming body by using a plurality of exposure optical systems 12Y, 12M, 12C and 12K, and the image is collectively transferred. Accordingly, when the exposure optical systems 12Y, 12M, 12C and 12K used for each color are different, slippage or bleeding of color occurs due to a tilt, a bend, slippage of mounting position of the exposure optical systems 12Y, 12M, 12C, 12K. Slippage or bleeding of color is easily observed (about 0.03 mm), and therefore, it is a problem in practice.

Figure 7:
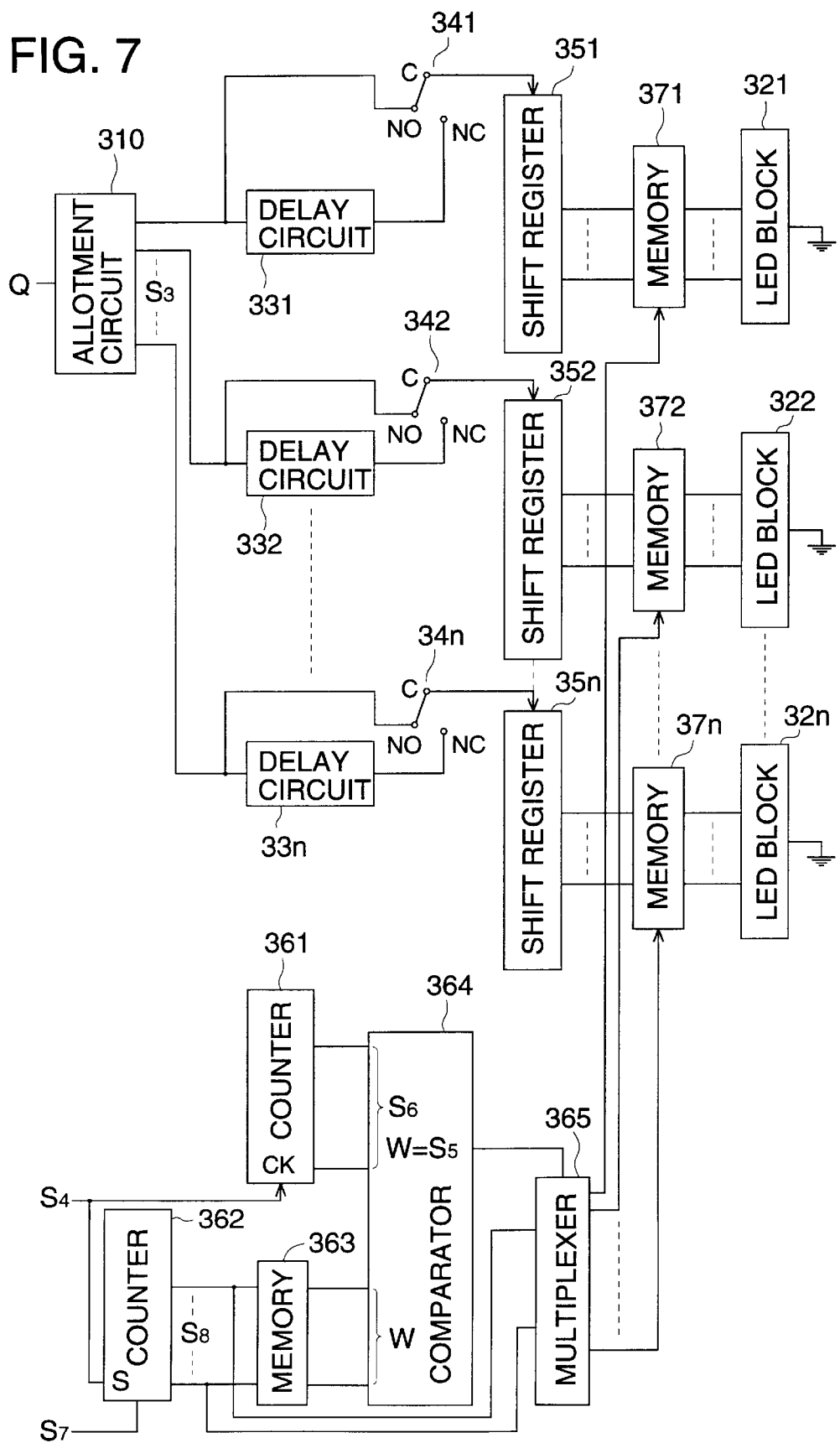
FIG. 7 is a block diagram showing a scanning circuit in the present example.

FIG. 7 is a block diagram showing a scanning circuit 300 in the present example.

In the scanning circuit 300, an LED array is divided into a plurality of blocks; exposure timing for each block, normally, timing of image data transfer and image exposure are controlled corresponding to the degree of its tilt or bend, or the direction from the upstream side in the primary scanning direction; thereby, a tilt or bend of the mounted LED array is corrected and light emission controlled; and raster scanning is conducted so that the tilt or bend of the LED array does not appear as the tilt or bend of an image as it is, in the primary scanning line. The scanning circuit 300 is provided with a separation circuit 310, LED blocks 321–32n, in which LEDs are integrated array-like, delay circuits 331–33n, having a capacity of K times of m-bits, digital switches 341–34n, m-bit shift registers 351–35n, a counter 361 to adjust the reference time by which light emission start timing of the LED block is determined, a counter 362, a memory 363 in which delay time to light emission start of each LED block 321–32n is stored by using block numbers of LED blocks 321–32n as the address, a comparator 364, a multiplexer 365, and m-bit parallel-in parallel-out type memories 371–37n.

Next, referring to FIGS. 8 and 9, operations of the scanning circuit 300 in the present example will be described.

FIG. 8 is a time chart showing operations of the scanning circuit 300. FIG. 9 is a diagram showing a deviation, from a predetermined dot line in the primary scanning direction, of a light image from the LED array.

Figure 9:
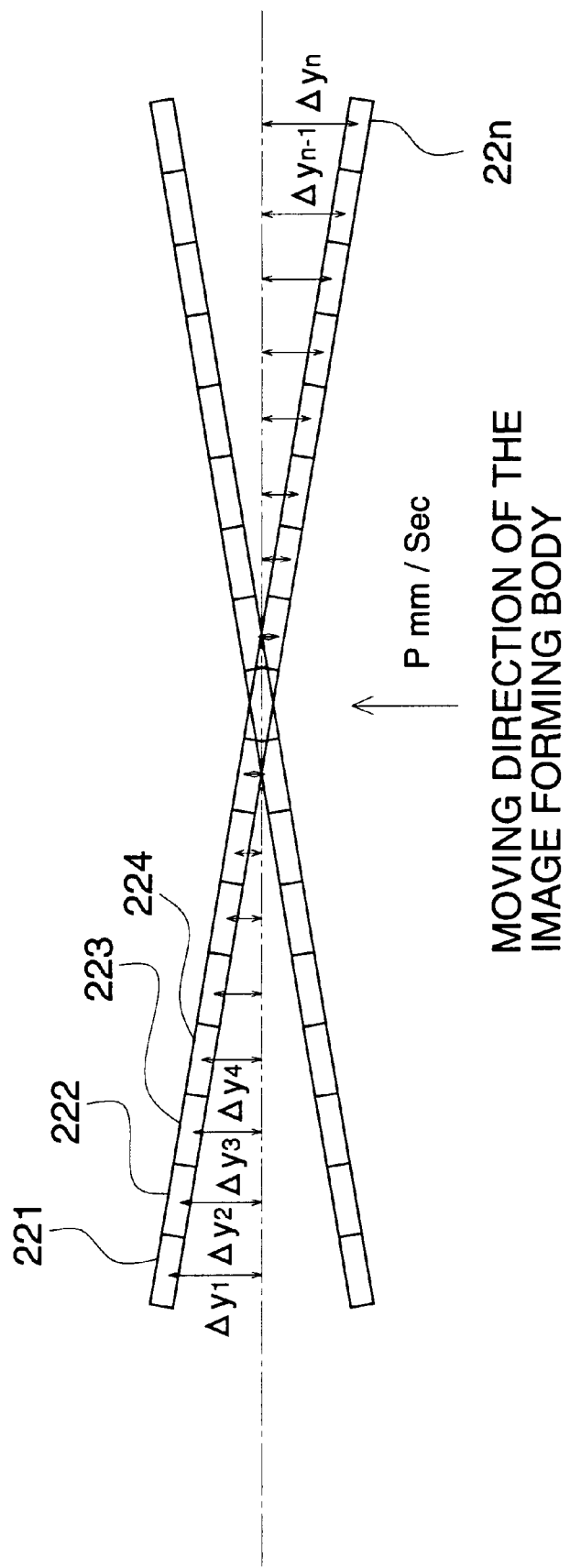
FIG. 9 is a diagram showing deviation of an optical image from an LED array from a dot line in the primary scanning direction which is previously desired.

As shown in FIG. 9, each LED array is arranged linearly in the direction perpendicular to the moving direction of the image forming body 10, and, for example, is divided into 17 blocks, in which each block of the LED array is designated 321, 322–32n in order from the left side.

FIG. 8(a) shows a recording start signal $S_1$, and FIG. 8(b) is a signal showing data write timing. At this timing, image data is inputted into a separation circuit 310, and is outputted according to arrangement of LED blocks 321–32n. Herein, image data Q is serial data for one line in the primary scanning direction. Data, outputted from the separation circuit 310, is delayed by K times of m-bits in delay circuits 331–33n, and outputted to a NC terminal of digital switches 341–34n. Herein, the value of K can be individually set in the delay circuits 331–33n. Due to this, when the arrangement direction of the LED blocks is in the primary scanning direction, and the rotational direction of the image forming body 10 is in the subsidiary scanning direction, for example, in order to obtain the resolution of 5/mm in the subsidiary direction, a line interval y in the subsidiary scanning direction is 200 $\mu$m. In FIG. 9, when light images on the photosensitive surface of the LED block respectively have distances $\Delta y$ ($\Delta y_1$–$\Delta y_n$) from a predetermined dot line (shown by a one-dotted chain line) in the primary scanning direction, viewed in the subsidiary scanning direction, an integer portion of $\Delta y/y$ is the value of K of the LED blocks 321–32n.

Due to the above description, when the value of K for each LED blocks 321–32n is determined, the capacity of the delay circuits 331–33n corresponding to the LED blocks 321–32n is determined. When K=0, it is necessary that the separation circuit 310 is connected to shift registers 351–35n without delay. In order to realize this, digital switches 341–34n may be switched to the NO terminal side.

Further, relating to a value below the decimal point of $\Delta y/y$, for example, W is found by an expression of $\Delta y/128$, and is written into the memory 363. Herein, a numeral 128 of the denominator of the right side means that the line interval y in the subsidiary direction is divided into 128 equal parts, and is determined by the counter 361.

The counter 361 counts a clock $S_4$, and outputs a count value $S_6$, shown in FIG. 8(d), by which recording time $S_w$ is, for example, divided into 128 equal parts. This count value S6 means the reference time to determine the light emission starting time of the LED block.

The counter 362 is set to "1" for every count value $S_6$ of the counter 361, and counts a clock $S_7$ of n times of the clock $S_4$. This count value $S_8$ is shown in FIG. 8(e), and means block numbers 1–n of the LED blocks 321–32n–22n.

The memory 363 outputs an adjustment amount W ($W_1$–$W_n$) of the light emission starting time corresponding to the count value $S_8$ shown in FIG. 8(e). The adjustment amount W of the light emission starting time makes a round for every count value S5, shown in FIG. 8(c), and is outputted.

The comparator 364 outputs "1" when the adjustment amount W of the light emission starting time coincides with the count value S5, which is the reference time. At this time, the mutiplexer 365 decodes the count value $S_8$, and sets data into the memories 371–37n corresponding to $S_8$. The light image is linearly formed on the photosensitive surface when the LED is turned on or turned off corresponding to data "1", "0", which is stored in the memories 371–37n.

This amount of slippage can be easily measured at the time of mounting or adjustment of the color image forming apparatus. By writing the amount of slippage into the memories 371–37n at the time of mounting, adjustment at the time of mounting of the LED array is scarcely necessary, and adjustment time is greatly reduced.

When the linearity or directionality among arranged LED arrays is irregular, a slippage occurs in superimposed toner images, and so-called color slippage or color bleeding occurs in the formed image. In the present example, the color slippage or color bleeding is prevented as described above, so that the color image quality is prevented from lowering.

Figure 10:
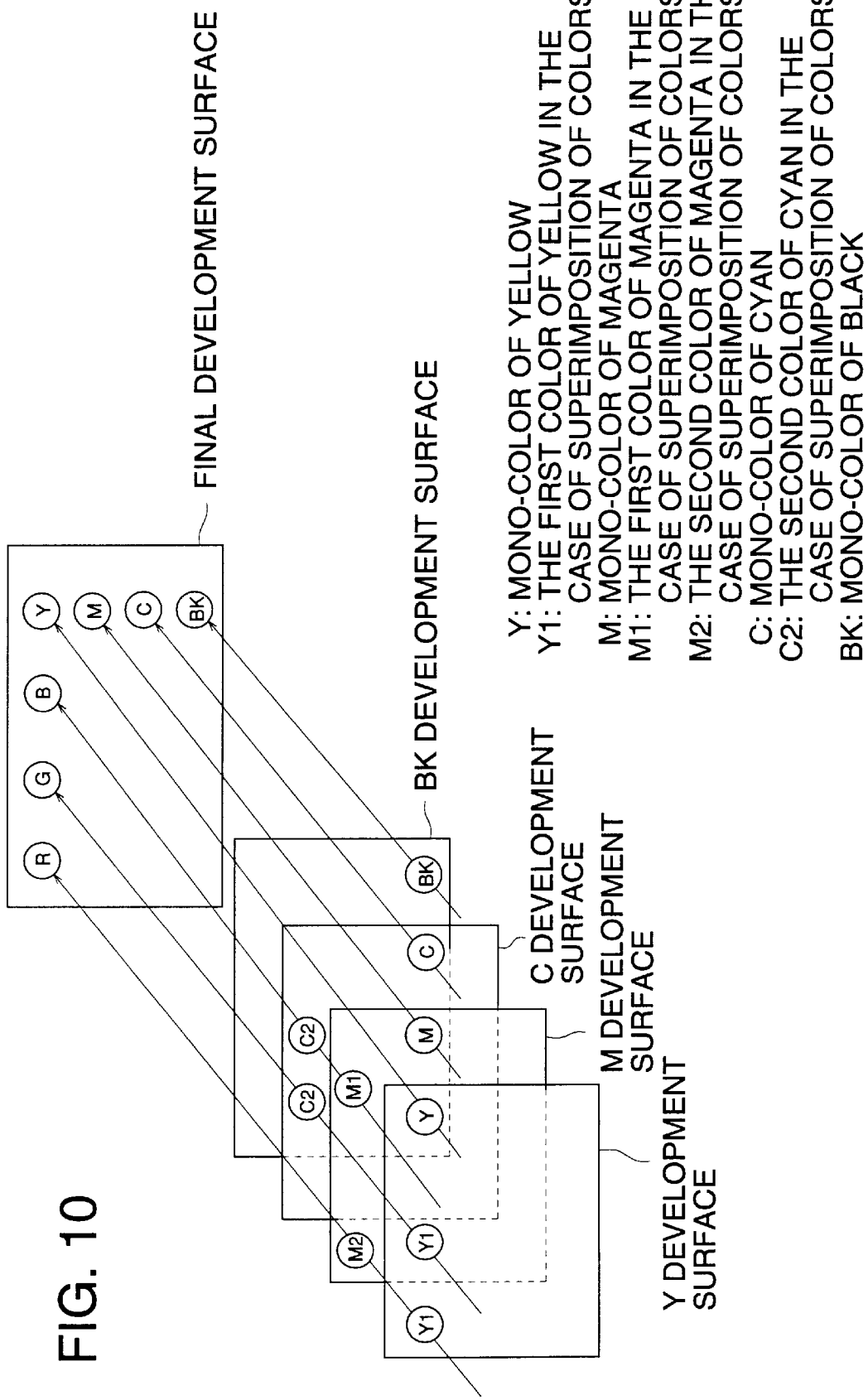
FIG. 10 is a view showing a process by which 7-color multicolor image is realized.

FIG. 10 shows a process to realize a multi-color image of 7 colors, from 4-color toners in which the image forming order is yellow(Y), magenta (M), cyan (C), and black (BK), in the present example.

| First color | Second color | Superimposed color |
| --- | --- | --- |
| Y | | |
| Y + | M → | Red (R) |
| Y + | C → | Green (G) |
| M | | |
| M + | C → | Blue (B) |
| C | | |
| BK | | |

Figures 6A, 6B, 6C:
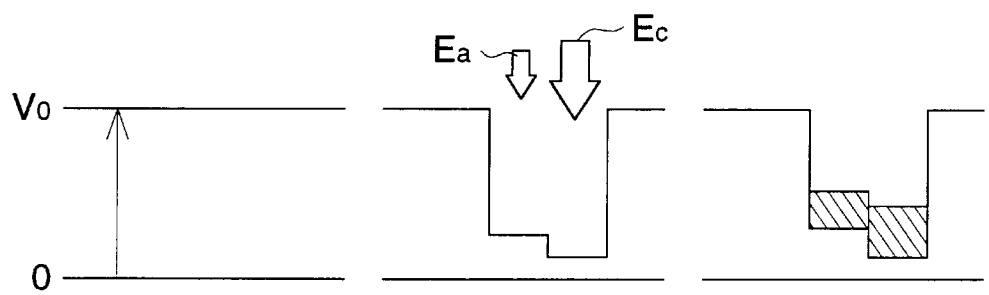
FIGS. 6(a) through 6(f) are diagrams showing the KNC process of the internal exposure system.
Figures 6D, 6E, 6F:
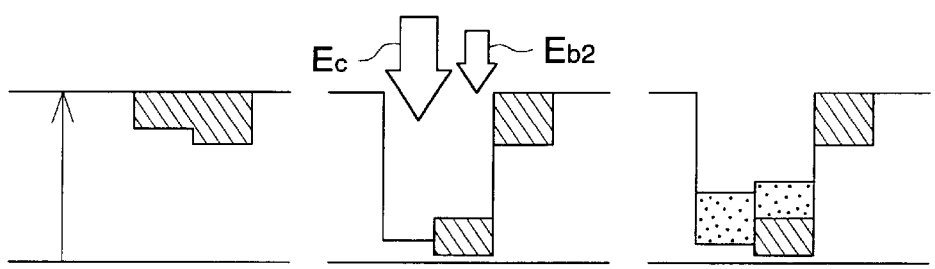

In the above 7 colors, specifically, there is no problem in the case of mono-color. However, in the case of red (R), green (G), blue (B), formed by superimposition of 2 color toners, there is a problem in the toner adhering amount, and in order to obtain an appropriate shade, it is necessary that the first color toner adhering amount is equal to the second color toner adhering amount. A color image system of the present example, by which a multi-color image of 7 colors is obtained by the superimposition of 2 color toners, will be described below, by showing again FIG. 6. FIG. 6(a) shows a condition under which uniform charging of the surface potential $V_0$ is carried out by a charger onto the peripheral surface of the image forming body 10, the back of which is grounded. In FIG. 6(b), after the image forming body 10 has been uniformly charged, image exposure is carried out according to an image signal by the exposure optical system, and the electric charge of an image-exposed portion is eliminated, and the potential of that portion is lowered. FIG. 6(c) shows a condition under which the reversal development of the first color is carried out, and the first color toner adheres to the image exposure portion and is developed. FIG. 6(d) shows a condition that the second charging is carried out by the charger. FIG. 6(e) shows a condition that the second image exposure is carried out on the first color toner. On a portion onto which the second color image exposure has been conducted, a latent image, to which a toner layer potential of toner itself by the first color adhered toner is added, is formed. FIG. 6(f) shows a condition that the second color reversal development is carried out and the second color toner is superimposed on the first color toner. When the first color image exposure amount is the same as the second color image exposure amount, the second color toner adhering amount is smaller than the first color toner adhering amount, and a balance between the first and second color toner adhering amounts is lost. Therefore, the first color image exposure pulse width or power is decreased. When the exposure power to form the primary color maximum image density is 100, in red (R), green (G), blue (B), it is preferable, for the balance, that the secondary color exposure power is set to, for example, the following value. This exposure power 100 is 2.4 times of the half decay exposure light amount $E_{1/2}$.

$$Y(50) + M(70) \to R$$

$$Y(55) + C(70) \to G$$

$$M(60) + C(75) \to B$$

As described above, when the first color pulse width or output power is decreased, the color balance is greatly improved. However, it is not yet satisfactory. It is because good color balance and poor color balance occur depending on the image pattern. For example, when good color balance is obtained for a half tone dot, the balance is poor for a solid image. When balance is good for a solid image, the balance is poor for a half tone dot. There is a tendency that the difference of hue is made in order of a solid image, fine line (characters), isolated point, in the image pattern. This reason is shown in FIG. 11.

Figure 11:
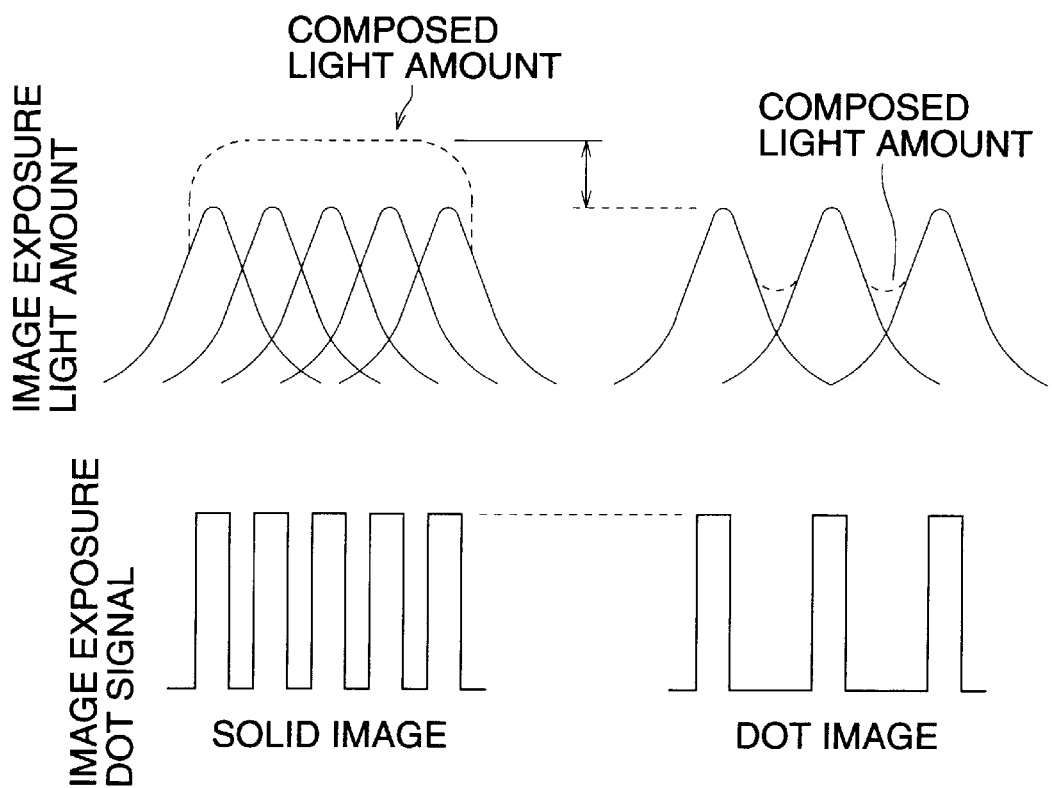
FIG. 11 is a diagram showing factors by which color phase difference is produced by image patterns.

FIG. 11 is a diagram showing factors by which the difference of hue is made depending on the image pattern.

The image exposure is spot exposure, however, it has practically a spread. Accordingly, even when the image exposure is conducted by the same power in the solid image and dot image, the difference is made in the charging potential on the image forming body 10. This is a cause by which the difference of hue is made depending on the image pattern, and this tendency is seen without depending on the toner color. When the correction factor of the output power depending on the image pattern is $di_1$ ($i_1$=1–5), for example, the following values are experimentally obtained as the appropriate values.

$$Y(50) \times di_1 + M(70) \to R$$

$$Y(55) \times di_1 + C(70) \to G$$

$$M(60) \times di_1 + C(75) \to B$$

TABLE 1

| Image pattern | | Correction factor of output power |
|---|---|---|
| Graphics | solid | $d_1$ = 110% |
|  | others (fine line) | $d_2$ = 120% |
|  | point 5.5–8 | $d_3$ = 120% |
| Character | point 9–12 | $d_4$ = 115% |
|  | point 12- | $d_5$ = 110% |

When the image pattern of 1 page is a single image pattern such as a solid graphic image or a 9 point character image, a good hue print image is obtained by the above setting condition. However, practically, there are many complex image patterns in which, for example, there is a solid graphic image on one portion, and a 9-point character image exists on the other portions. Image information for one page is analyzed, and a 10% correction is carried out as $di_1$, on the portion judged to be a solid graphic image, and a 15% correction is carried out as $di_1$, on the portion judged to be a 9-point character, thus the output power for the first color is formed. Thereby, for a complex image pattern, a good hue print image can also be obtained.

Further, in some cases, the image pattern of one page is a more complex image pattern. Accordingly, one page is divided into blocks by image discrimination, and by setting the following weighted average correction factors $di_2$ ($i_2$= 1–5) for each block, conspicuous disturbance of the hue in the page can be prevented.

$$Y(50) \times di_2 + M(70) \to R$$

$$Y(55) \times di_2 + C(70) \to G$$

$$M(60) \times di_2 + C(75) \to B$$

TABLE 2

| Image pattern | | Correction factor of output power | Area | Weight |
|---|---|---|---|---|
| Graphics | solid | $d_1$ = 100% | $S_1$ | $W_1$ = 2 |
|  | others (fine line) | $d_2$ = 120% | $S_2$ |  |
| Character | point 5.5–8 | $d_3$ = 120% | $S_3$ |  |
|  | point 9–12 | $d_4$ = 115% | $S_4$ | $W_2$ = 1 |
|  | point 12- | $d_5$ = 110% | $S_5$ |  |

The weighted average correction factor $d_{i2}$ is calculated by the following equation (1).

$$\text{(Equation 1)} \quad d_{i2} = \frac{(d_1 S_1 + d_2 S_2)W_1 + \sum_{i=3}^{5} d_{iI} S_i}{(S_1 + S_2)W_1 + \sum_{i=3}^{5} S_i} \quad (1)$$

Figure 12:
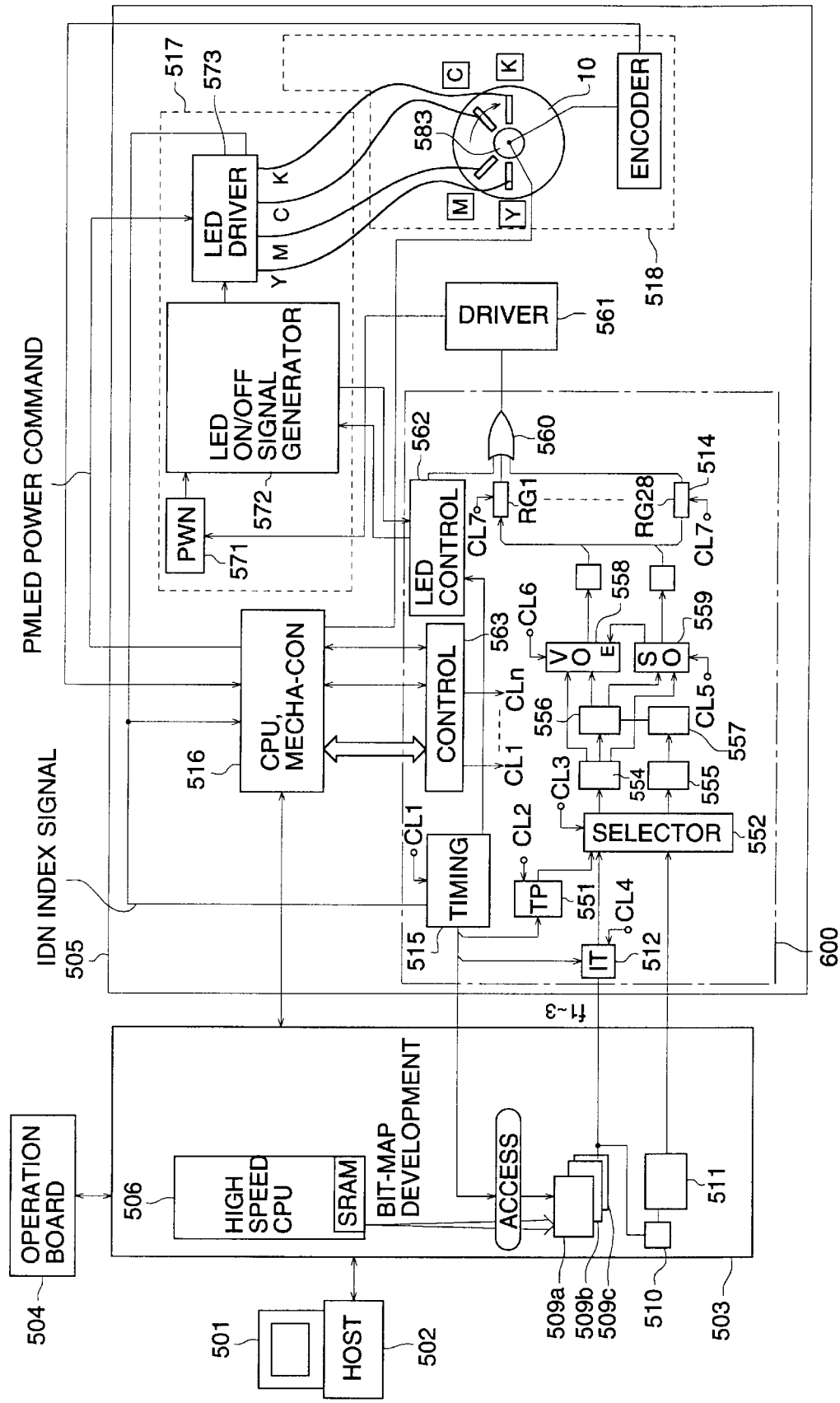
FIG. 12 is a circuit diagram of a color image forming apparatus in which adjustment processing is carried out by image patterns.

FIG. 12 shows a circuit diagram of a color image forming apparatus in which, when the above-described multi-color toner images are superimposed, the first image exposure amount and the second image exposure amount of 2 colors are adjustment-processed depending on the image pattern.

The present example is structured by a printer controller 503 (including an operation board 504) and a printer main body 505.

The printer controller 503 functions as follows: it decodes image information (mainly, a page descriptive language) from a host computer 502, develops it to bit-map data, and sends to a video interface 600 in a printer main body 505; and recognizes the printer main body, and a preparing condition of the host, and sends instructions to the host 502, an operation board 504, and video interface 600. As components, the printer controller 503 has a high speed CPU 506, plane memories 509 (a–c), which holds 1-page bit-map developed data, a RAM 510, a dot condition judgment circuit 511, etc. The plane memories 509a, 509b, 509c respectively store Y, M, C dot data, and when data in 3 memories are all "1", it means BK(Y+M+C).

The printer main body 505 is composed of the CPU, mecha-con (which controls charging, exposing, transferring, fixing, etc.), the video interface (one-chip gate array) 600 which is in charge of image data processing (the generation of read/write timing for image data, processing of image data, selection of instruction data), a timing generation circuit 515, an optical control section 517, and a print section 518.

The video interface 600, which is in charge of image signal processing, has, other than an input conversion circuit 512, a test pattern generator (TP) 551, a selector 552, a mono-color·multi-color detection circuit 554, an image pattern discrimination circuit 555, a hue correction circuit 556, a correction factor calculation circuit 557, a video control circuit 558, a smoothing process control circuit (SO) 559, a register group RG1–RG28 (514), an OR circuit 560, a laser control circuit 562, a control circuit 563 (which outputs control signals CL1–CLn to each circuit while sending/receiving the information to or from the mecha-con 516).

The input conversion circuit 512 converts a video signal from the printer controller 503, into 4-bit signal of Y, M, C, K per one dot. The test pattern generator (TP) 551 is a ROM by which a fixed test pattern can be outputted, even when no controller is incorporated. The selector 552 can selectively pass the test pattern and normal video input signals.

Figure 13:
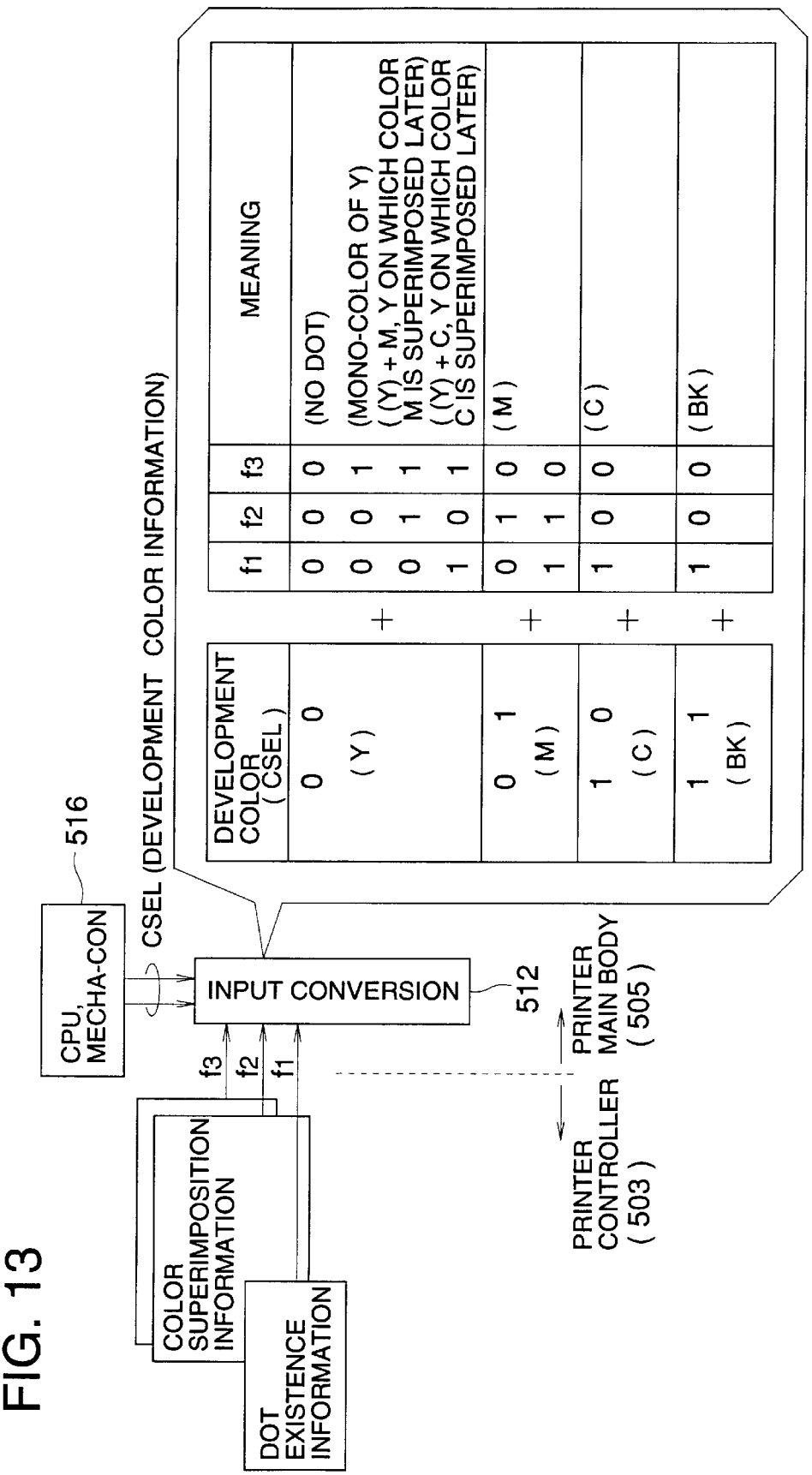
FIG. 13 is a view showing an input mechanism of video dot data.

The video interface 600 includes the input conversion circuit 512, by which data from plane memories 509a, 509b, 509c is converted into video data (dots), and is inputted into the selector 552. FIG. 13 shows an input mechanism of video (dot) data. In the selector 552, mono-color and 2-color superimposition dot data (Y+M, Y+C, M+C) are detected by the mono-color·multi-color detection circuit 554. Further, the image pattern discrimination circuit 555 discriminates the following (1)–(3), as image pattern information: (1) characters, (1.1) character size (the point No. of the printing type); (2) graphics, (2.1) solid, others (half tone); and (3) the ratio of the above (1) and (2) on 1 page. In the correction factor calculation circuit 557, the weighted average correction factor d0 is calculated by the above equation (1), according to the result of the discrimination of the image pattern discrimination circuit 555, and inputted into the color phase correction circuit 556. The color phase correction circuit 556 outputs dot data [Y(100), M(100), KB(100)] as the mono-color, and dot data [Y(50)×$di_2$+M(70), y(55)×$di_2$+C(70), M(60)×$di_2$+C(75)], as 2-color superimposition data, by the input from the mono-color·multi-color detection circuit 554, and the color phase correction circuit 556.

In this data, hue correction and smoothing processing are judged for each dot, by the video control circuit 558, and smoothing process control circuit 559, the registers RG1–RG28, storing the printing condition corresponding to the dot, are accessed. The condition data is outputted from the accessed register (any one of RG1–RG28), and the optical control section 517 controls the printing operation corresponding to the data. All of operation timing is controlled for each dot unit, using the index signal IND, obtained from the printing section 518, as the standard, wherein the index signal is a signal showing that the beam comes to a predetermined position near the trailing edge of the image on the photoreceptor. That is, the index signal IND is supplied to the timing generation circuit 515, and based on this, a high speed clock (5 MHz) for each dot unit, in which phases are synchronized with each other, is generated. The high speed clock is sent to the printer controller 503, and the like, and in synchronization with the clock, dot data is transferred, signal processing is carried out in real time, and printing is carried out.

The optical control section 517 of the exposure optical system 12 has the pulse width modulation circuit 571, LED on/off signal generator 572, and LED driver 573. The printing section 518 has, as shown in FIG. 1, the image forming body 10, chargers 11Y, 11M, 11C, 11K, and the developing devices 13Y, 13M, 13C, and 13K for 4-color (Y, N, C, K). The rotation of the image forming body 10 is controlled by a stepping motor 583, and its number of rotations is detected by an encoder, and sent to the CPU and mecha-con 516.

Figure 14:
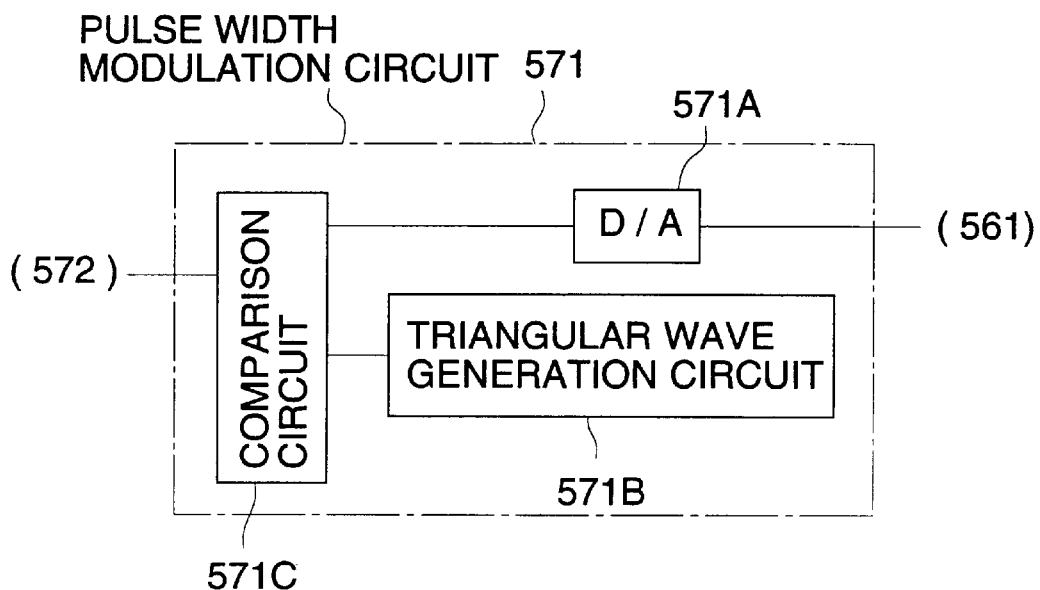
FIG. 14(a) and 14(b) are illustrations of a pulse width modulation circuit.
Figure 14:
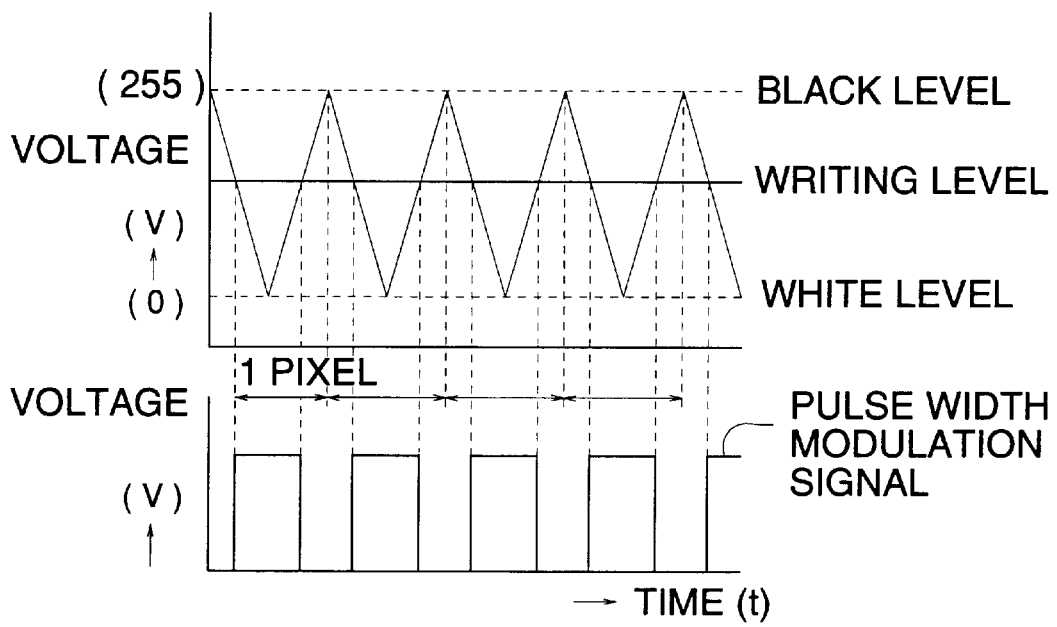

By this circuit structure, relating to the 2-color superimposition color image, in the present example, the first color image exposure amount is changed depending on the image pattern, and the output level of the LED power is pulse width modulated by the pulse width modulation circuit 571. FIG. 14 is an illustration of the pulse width modulation circuit 571. FIG. 14(a) is a circuit diagram, and FIG. 14(b) is an illustration of the motion. The output level of the Led power is converted into an analog level by the D/A converter 571A. On the other hand, a triangle wave outputted from the triangle wave generation circuit 571B, as a comparison wave, is compared with the write level by the comparator 571C, and a signal, obtained as the result, is outputted from the pulse width modulation circuit 571, as a PWM signal.

Figure 3:
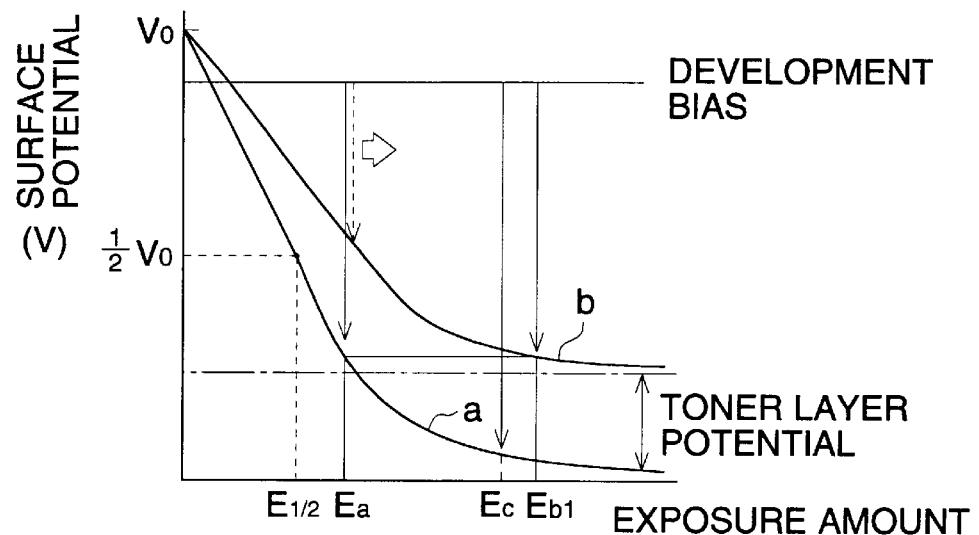
FIG. 3 is a graph showing the KNC correction in an external exposure system.
Figures 4A, 4B, 4C:
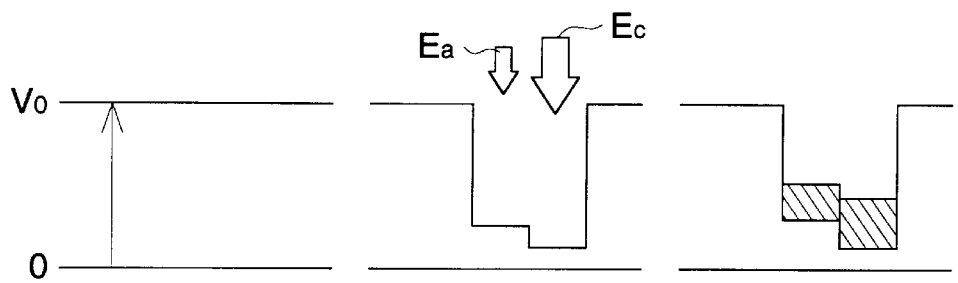
FIGS. 4(a) through 4(f) are diagrams showing surface potential on the image forming body in the KNC process of the external exposure system.
Figures 4D, 4E, 4F:
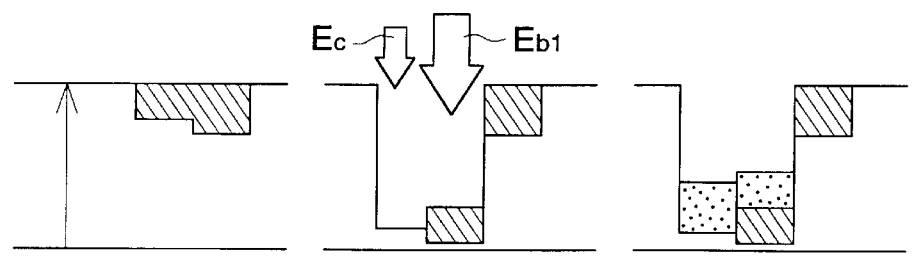

In order to apply the present invention to multi-value recording, the color correction is carried out for image density data, that is, multi-value level data of yellow, magenta, cyan, black. A degree of this color correction, is small in the low density portion corresponding to potential characteristics shown in FIG. 3, and large in the high density portion.

An example, in which the pulse width is changed in order to change the image exposure amount, was described above, however, the LED power for each dot may be changed without changing the pulse width. In also the case where more than 3 colors are superimposed, the exposure condition for each color may be set by the pattern in the same manner as in the case of 2 colors.

The discrimination of the image pattern is automatically conducted by the printer controller, however, other than that, the customer may switch or adjust the image pattern, for example, by a manual switching means of "graphics", "characters", "solid image", etc.

As a color image forming apparatus of the present example, the image forming system was described above, in which toner images are superimposed on the image forming body 10 using an intermediate transfer body. Other than this system, the present example is also applied to a color image forming apparatus, in which the toner image is directly transferred onto a transfer sheet.

EXAMPLE 3

Next, an example in which the present invention is applied to a color image forming apparatus, represented by a color copier, by which a multi-value image is reproduced.

A color image forming apparatus in the present example, has the same mechanical structure as that described referring to FIGS. 1 and 2, and therefore, detailed description will be omitted.

An adhering condition of toner, obtained by the KNC process when multi-value gradation is reproduced, is not determined only by the exposure which is optically modulated simply according to image density data, and has relation to the following phenomena.

The first phenomenon is that the next toner hardly adheres onto a solid portion of the toner image due to the toner layer potential. This is simply called an average slippage by the structure of the preceding image. The second phenomenon is a deformation of the latent image by the structure of the previously formed toner image, that is, an edge effect, which occurs at the edge of an isolated point, an isolated dotted line, characters, and a solid portion, when colors are superimposed, or a halo effect, which is seen as pseudo outline phenomena, the cause of which is the same as the edge effect, and which is a specific phenomenon to the KNC process using the superimposition method. The slippage due to this phenomenon is simply called a partial slippage due to the structure between images. The third phenomenon is latent image deformation which occurs under the condition that no toner image is formed yet on the image forming body 10, or which occurs depending on the kinds of image, without depending on the structure of the previously formed toner image, that is, the edge effect phenomenon, specific to the electrophotographic method, which is a slippage between image data and a reproduction image, and which is simply called the slippage due to the image structure. The edge effect or halo effect also occurs depending on developing methods, or characteristics of the photoreceptor, and sometimes reaches as large as 0.5–2 mm.

In the present example, the edge effect and halo effect are simply conducted as the correction of the adjoining pixel level.

Figure 30:
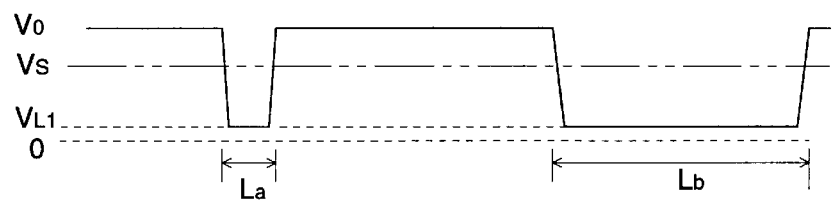
FIGS. 30(a) through 30(e) are diagrams showing a process by which toner adhering conditions are determined in the KNC process.
Figure 30:
Figure 30:
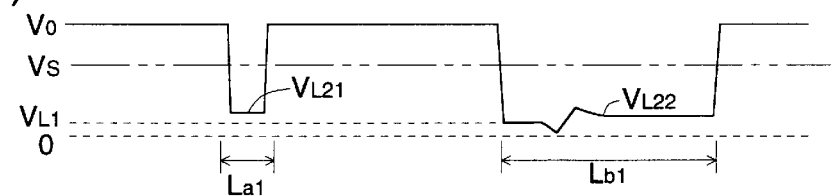
Figure 30:
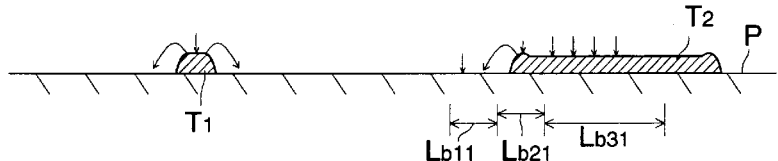
Figure 30:

FIG. 30 is a diagram showing a process to determine a toner adhering condition in the KNC process. In FIG. 30, $V_0$ is initial charging potential on the surface of the image forming body 10, $V_s$ is DC bias potential applied on the developing sleeve surface, and $V_{L1}, V_{L21}, V_{L22}$ are potential of the latent image portion. The formed electrical field is deviated from the image exposure amount, that is, image data, due to not only the potential voltage difference between $V_S$ and $V_{L1}$, but also previously formed images of 1–3, and toner is attracted onto the image forming body 10.

FIG. 30(a) shows a relationship of potential, just before the developing processing by the first color toner. In this developing process, each color multi-value image density data is multi-value modulated and image exposure are conducted, considering the superimposed condition of the toner image. Herein, the latent image potential is uniformly $V_{L1}$ in the drawing, for a simple explanation. $L_a$ is a latent image showing an isolation point or isolation line. $L_b$ is a latent image corresponding to a solid portion having a large area.

Due to also the counter electrode effect, in a general developing method, more or less, a strong electrostatic field is produced on edge portions of the latent image $L_a$ and latent image $L_b$, (hereinafter, simply called edge effect). On the other hand, the electric field on the central portion of the latent image $L_b$ becomes weak, and therefore, toner hardly adheres onto the solid portion of the latent image $L_b$. On the other hand, toner is more easily adheres onto a line or an edge portion than the central portion of the solid portion. This is the foregoing third phenomenon.

FIG. 30(b) is a sectional view in which each latent image is visualized by the first color toner under the potential relationship shown in FIG. 30(a).

The letter P shows the image forming body 10, and the letter $T_1$ shows a toner image, forming an isolated point which is visualized by the first color toner. The letter $T_2$ shows a toner image having a large area which is visualized by the first color toner. This toner image T2 is composed of the central portion, and the edge portion around the central portion. It is shown that the toner image $T_2$ is an irregular toner image in which a smaller amount of toner adheres to the central portion than to the edge portion, due to the edge effect (this is the third effect). Incidentally, the edge effect not only affects when the latent image forming the isolated point, or the latent image forming the fine line which is the isolated line, is emphasized and visualized, but also, when the latent image is formed too small, it reversely affects such that the visualization of the latent image becomes difficult.

FIG. 30(c) shows the relationship of potential when the second color image exposure is conducted after recharging, that is, just before the development processing by the second color toner.

In FIG. 30(c), the image exposure $L_{a1}$ is conducted on the same position as the first one, and only the image exposure $L_{b1}$ is conducted on the shifted position. In FIG. 30(c), $V_{L1}$ and $V_{L21}, V_{L22}$ are mixed, and the potential distribution is in disorder. The letters $V_{L21}, V_{L22}$ are potential of the latent image portion formed on the first color toner, and are higher than $V_{L1}$. Other symbols have been described above, and therefore, omitted.

A reason in which the potential distribution of $L_{b1}$, shown in FIG. 30(c), and the electrical field are disturbed, will be described below.

As described above, the developing process of the second and subsequent color is conducted under the condition that the previously visualized toner image is carried on the image forming body 10. Accordingly, the previously formed toner image varies the latent image potential and the electric field of the second and subsequent color. In more detail, the letter T2 is, as described above, under the condition that a larger amount of toner is adhered onto the edge portion, and a smaller amount of toner adhered onto near the central portion. These toners have an effect to increase the potential, and to prevent the toner from adhering. These are the above-described first phenomenon.

FIG. 30(d) is a sectional view showing an electric field, formed on each latent image in the potential relationship, shown in FIG. 30(c).

The state of the electric field on the previously formed latent images $L_{a1}$ and $L_{b1}$, is shown by an arrow of the line of electric force.

A new latent image $L_{a1}$ is formed on the toner image $T_1$ corresponding to the isolated point, visualized by the first color toner. It can be seen that this toner image $T_1$ affects the electric field, formed on the latent image $L_a$ from the above-described toner layer potential. Concretely, it can be seen that the electric field to adhere the toner is weaken by the partial electric field, generated near the center of the toner image $T_1$, and thereby, the second color toner hardly adheres to the toner image $T_1$. This is the above-described second phenomenon. Although not shown in the drawing, sometimes, the second color toner easily adheres around the first color toner, and adheres to that portion depending on the condition.

The newly formed latent image $L_{b1}$ is formed, when the same image as the irregular toner image $T_2$, is image exposed on the irregular toner image $T_2$ by shifting the position. Accordingly, it is considered that the electric field formed on the new latent image $L_{b1}$, is distorted on the superimposed portion and near the portion by the toner image $T_2$.

The latent image $L_{b1}$ is distinguished into 3 area of the latent image $L_{b11}$, latent image $L_{b21}$, and latent image $L_{b31}$ from the difference of the toner adhering amount of the previously formed toner image. The latent image $L_{b11}$ is formed on a portion of the image forming body 10 onto which the first color toner is not adhered. The latent image $L_{b21}$ is formed on an edge portion of the toner image $T_2$, and formed on a portion in which the change of the toner adhering amount is the largest. The latent image $L_{b31}$ is formed on a portion onto which the smaller amount of toner than the edge, adheres, on the central portion of the toner image $T_2$. The potential of the latent image $L_{b\ 11}$, latent image $L_{b21}$, and latent image $L_{b31}$ is not the same, due to the toner potential, even when the same light amount is irradiated.

Further, it can be seen, from the situation of the line of electric force, that the latent image $L_{b21}$ generates the halo effect. Herein, the halo effect is a kind of the edge effect, and the following phenomenon is generated, the second color toner hardly adheres to the edge of the fist color toner image, and easily adheres to its periphery. That is, the latent image $L_{b21}$ is an area in which the edge effect is generated by the first color toner. That is, it is shown that on the edge, the electric field to adhere the toner is smaller than the electric field of the latent image $L_{b31}$, formed on the central portion side of the toner image $T_2$, and on the periphery, the electric field to adhere the toner is larger than the electric field, formed on the portion $L_{b11}$, on which no toner image exists.

FIG. 30(e) is a sectional view showing the condition of superimposition of the toner images, visualized under the condition of the potential shown in FIG. 30(c).

An adhering amount of the toner image $T_3$, formed of the second color toner, is small, due to the condition of the electric field shown in FIG. 30(d). That is, the color of the first color toner, not the secondary color obtained by making the adhering amount of the toner image $T_1$ and toner image $T_3$ the same, becomes strong, so that the color balance is lost. From the above-described state of the electric field, relating to the toner image T4, formed of the second color toner, the same amount as that of the first color toner adheres onto the toner image T4 in the latent image Lb11; in the latent image Lb21, by the influence of the halo effect, a smaller amount of the second color toner is adhered onto the edge portion of the toner image T2, and a larger amount of the second color toner is adhered onto the peripheral portion; the second color toner is adhered onto the toner image T2 in the latent image Lb31, such that a smaller amount of toner than the amount of toner in the central portion and its vicinity of the toner image T2, is adhered onto the edge portion, and it can be seen that the adhered toner is slightly raised on the edge portion. Accordingly, it can be seen that, in a portion formed by superimposition of the edge portion of the toner image T2 and toner image T4, the halo effect becomes strong, and the density and color balance is lost. This is the second phenomenon.

On the other hand, in a solid portion, formed of the solid portion of the toner image T2 and that of the toner image T4, the second color density becomes lower. This is the first phenomenon.

The overall structure of the image processing circuit, adopted in the image forming apparatus of the present example, will be described.

Figure 15:
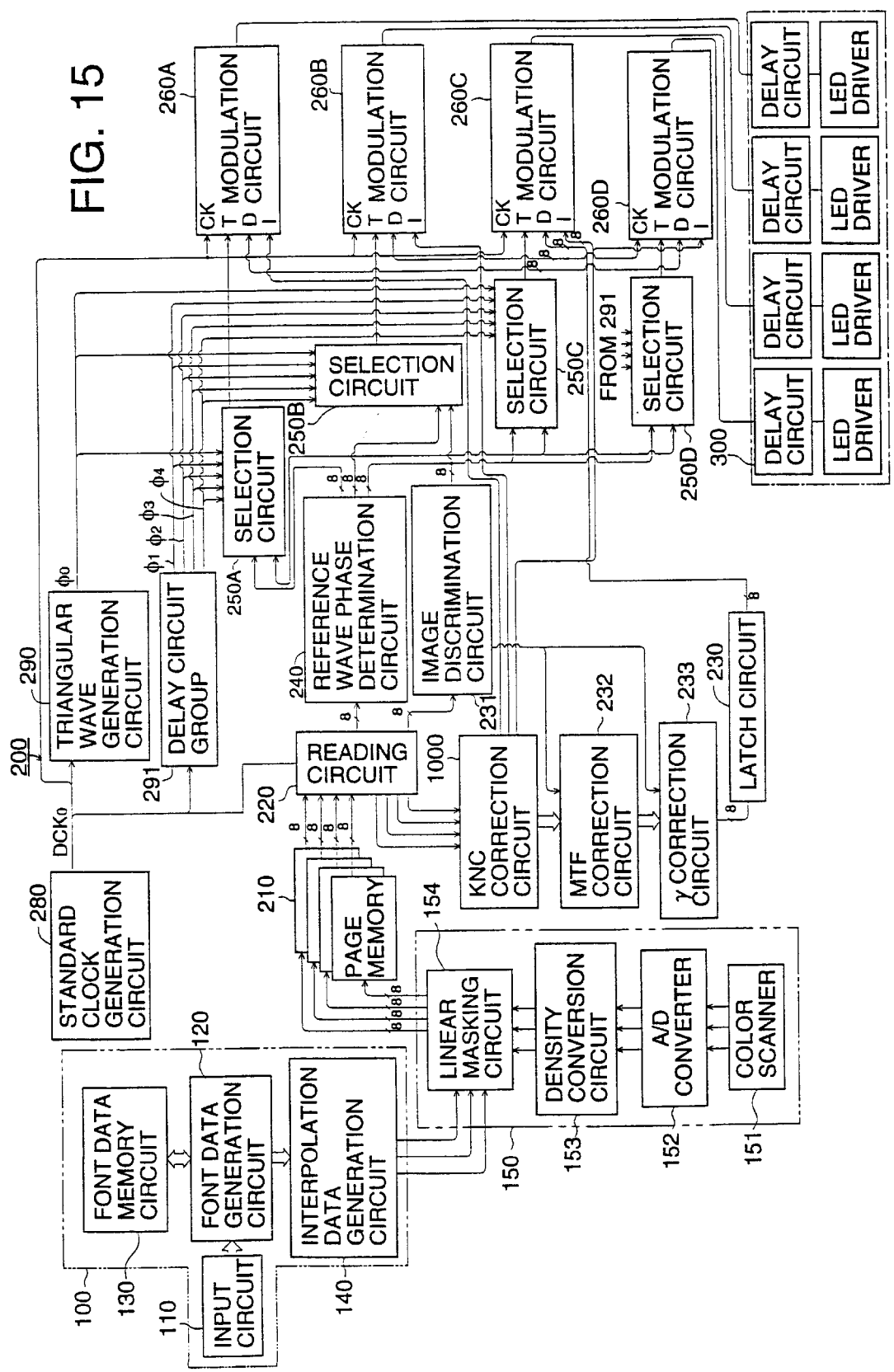
FIG. 15 is an overall block diagram of an image processing circuit in the present example.

FIG. 15 is an overall block diagram of the image processing circuit of the present example.

The image processing circuit of the present example is a circuit, constituting a drive circuit of the scanning optical system, and, as shown in FIG. 15, is composed of an image data processing circuit 100, a modulation signal generation circuit 200, and a scanning circuit 300.

Referring to FIG. 15, the outline structure of each circuit will be described below.

The image data processing circuit 100 is a circuit by which the edge portion of font data is interpolated and outputted, and is composed of an input circuit 110 composed of a computer, a font data generation circuit 120, a font data memory circuit 130, an interpolation data generation circuit 140. The image data processing circuit 100 sends a character code signal, a size code signal, a position code signal, and a color cod signal, from the input circuit 110, to the font data generation circuit 120. The font data generation circuit 120 selects an address signal from 4 kinds of input signals, and sends it to the font data memory circuit 130. The font data memory circuit 130 sends font data for one character, corresponding to the address signal, to the font data generation circuit 120. The font data generation circuit 120 sends the font data to the interpolation data generation circuit 140. The interpolation data generation circuit 140 interpolates the indentation or blank of image density data generated on the edge portion of font data, using the intermediate density, and sends to the linear masking circuit 154, for example, as 8-bit image density data. The linear masking circuit 154 converts the corresponding color to the density data of yellow (Y), magenta (M), cyan (C) and black (BK), corresponding to the color codes, and sends to the image density data memory circuit 210, composed of a page memory. As described above, the font, which is multi-value developed under the condition that each color font has the same shape and a different density ratio, is multi-value bit-map developed in each color page memory.

The image density data memory circuit 210 is, normally, a page memory (hereinafter, simply called the page memory 210), and a RAM (random access memory) which stores data for unit of a page, and which has a capacity to store multi-value image density data corresponding to, at least, 1 page (for 1 image area). In this connection, generally, the apparatus adopted for a color printer, has the page memory in which the image density signal, corresponding to color components of, for example, yellow, magenta, cyan, and black, can be stored.

The modulation signal generation circuit 200 has a read circuit 220, latch circuit 230, image discrimination circuit 231, MTF correction circuit 232, γ correction circuit 233, reference wave phase determination circuit 240, select circuits 250A, 250B, 250C, 250D, modulation circuits 260A, 260B, 260C, 260D, reference clock generation circuit 280, triangular wave generation circuit 290, delay circuit group 291, and the KNC correction circuit 1000 to correct the toner adhering condition necessary for the KNC process, is added.

In the modulation signal generation circuit 200 of the present example, one target pixel of image density data is formed of small pixels of m×n (width×length); the distribution of density data of adjoining pixels including the target pixel is replaced with the distribution of small pixels of m×n in the one pixel; the phase of reference wave of each line of small pixels is displaced, according to image density data of the small pixel which is obtained by distributing the target pixel data, multiplied by a constant P, corresponding to the distribution; thereby, the writing position of dots of n lines is displaced, and the latent image can be formed. The displacement of the writing position of dots is called the recording position modulation. The process to convert the target pixel into image density data of small pixels of m×n, is called the resolving power increasing process (RE process). By this RE process, high density recording is carried out.

The reading circuit 220 reads the continuous image density data of a unit of one scanning line, which is in timed relationship with the reference clock $DCK_0$, from the page memory 210, being triggered by the index signal, and sends the data to the reference wave phase determination circuit 240, image discrimination circuit 231, and KNC correction circuit 1000.

The latch circuit 230 is a circuit to latch the image density data, only during a period of time when processing of the reference wave phase determination circuit 240, which will be described later, is carried out.

The image discrimination circuit 231 discriminates which of the character area or half tone area the image is in, and determines the degree of MTF correction and γ correction. In this connection, the KNC correction circuit 1000 is provided in the front stage of the MTF correction circuit 232 and γ correction circuit 233, in FIG. 15, however, preferably provided in the back stage of them. This is for the reason that, specifically, when the correction value of image density data by them is large, the color phase can not be compensated for.

Although not shown in the drawing, it is also preferable that, in the same manner as above, the variable magnification correction circuit to change the magnification of the output image and the color conversion circuit to change the color tone or color phase are arranged in the front stage of the KNC correction circuit.

When it is discriminated that an image is in a character area of the character or line image, the image discrimination circuit 231 outputs the selection signal, by which the triangular wave selected by the reference wave phase determination circuit 240 is outputted to the modulation circuits 260A, 260B, 260C and 280D, to the selection circuits 250A, 250B, 250C and 250D. The MTF correction circuit 232, and the γ correction circuit 233 are not operated, and while image density data is not processed, it is sent to the modulation circuits 260A, 260B, 260C and 260D through the latch circuit 230. By this operation, a clear character and edge portion, in which the image color is not changed, can be reproduced. On the other hand, when it is discriminated that an image is in the half tone area, the image discrimination circuit 231 outputs the same selection signal as in the character area, only for an achromatic color component, that is, black data, and does not output the triangular wave selected by the reference wave phase determination circuit 240, for other color components, and sends the selection signal to output only the standard triangular wave φ0, to the selection circuits 250A, 250B, 250C, and 250D, and operates the MTF correction circuit 232 and γ correction circuit 233. Due to this operation, after the image density data except for black, which is read from the read circuit 220, is corrected by the MTF correction circuit 232 and γ correction circuit 233, the image density data is sent to the modulation circuits 260A, 260B, 260C, and 260D through the latch circuit 230. Due to the above operation, an image having no moire or color missing, can be formed in the halftone area, and on the other hand, an affect is made in which sharpness and tightness are given to the image by the black image.

The MTF correction circuit 232 is composed of a Laplacean filter, and gives the visual sharpness to an image, and the size is about 5×5 pixels. The value of this filter is experimentally determined from developing characteristics.

As shown in FIG. 15, the modulation circuits 260A, 260B, 260C and 260D modulate a signal of image density data inputted though the latch circuit 230, by the triangular wave which is the reference wave selected by the reference wave phase determination circuit 240, and generate a pulse width modulated modulation signal, and send to the scanning circuit 300.

Because the scanning circuit was described above, the explanation will be omitted.

On the other hand, the stabdard clock generation circuit 280 is a pulse generation circuit, generates pulse signals with the same repeated period as the pixel clock, and outputs to the read circuit 220, triangular wave generation circuit 290, delay circuit group 291, and modulation circuits 260A, 260B, 260C, 260D. For the sake of convenience, this clock is referred to as the standard clock $DCK_0$.

The triangular wave generation circuit 290 conducts waveform shaping of the standard triangular wave φ0, which is a reference wave with the same period as the pixel clock, according to the reference clock $DCK_0$. The delay circuit group 291 generate a plurality of clocks $DCK_1$–$DCK_4$ having the phase difference of each constant period (in this example, each ⅙ period) with respect to the reference clock $DCK_0$. According to this, the delay circuit group 291 output the triangular waves φ1–φ4 (in this example, the triangular wave φ1 delayed by ⅙ period, triangular wave φ2 delayed by ⅔ period, triangular wave φ3 advanced by ⅙ period, triangular wave φ4 advanced by ⅔ period).

The selection circuits 250A, 250B, 250C and 250D have the input sections for triangular waves φ1–φ4, the phases of which are shifted from the above reference triangular wave φ0, and select one of the triangular waves by the selection signal from the reference wave phase determination circuit 240, which will be detailed later, and send to input terminals T of the modulation circuits 260A, 260B, 260C, and 260D. The above description is the outline structure of the image processing circuit of the present example.

The circuit of each section of the image processing circuit in the present example will be successively detailed below.

First Example

Initially, referring to FIGS. 15–19, FIG. 22, and FIG. 23, an example of each circuit structure in the KNC correction circuit 1000 will be described.

Figure 16:
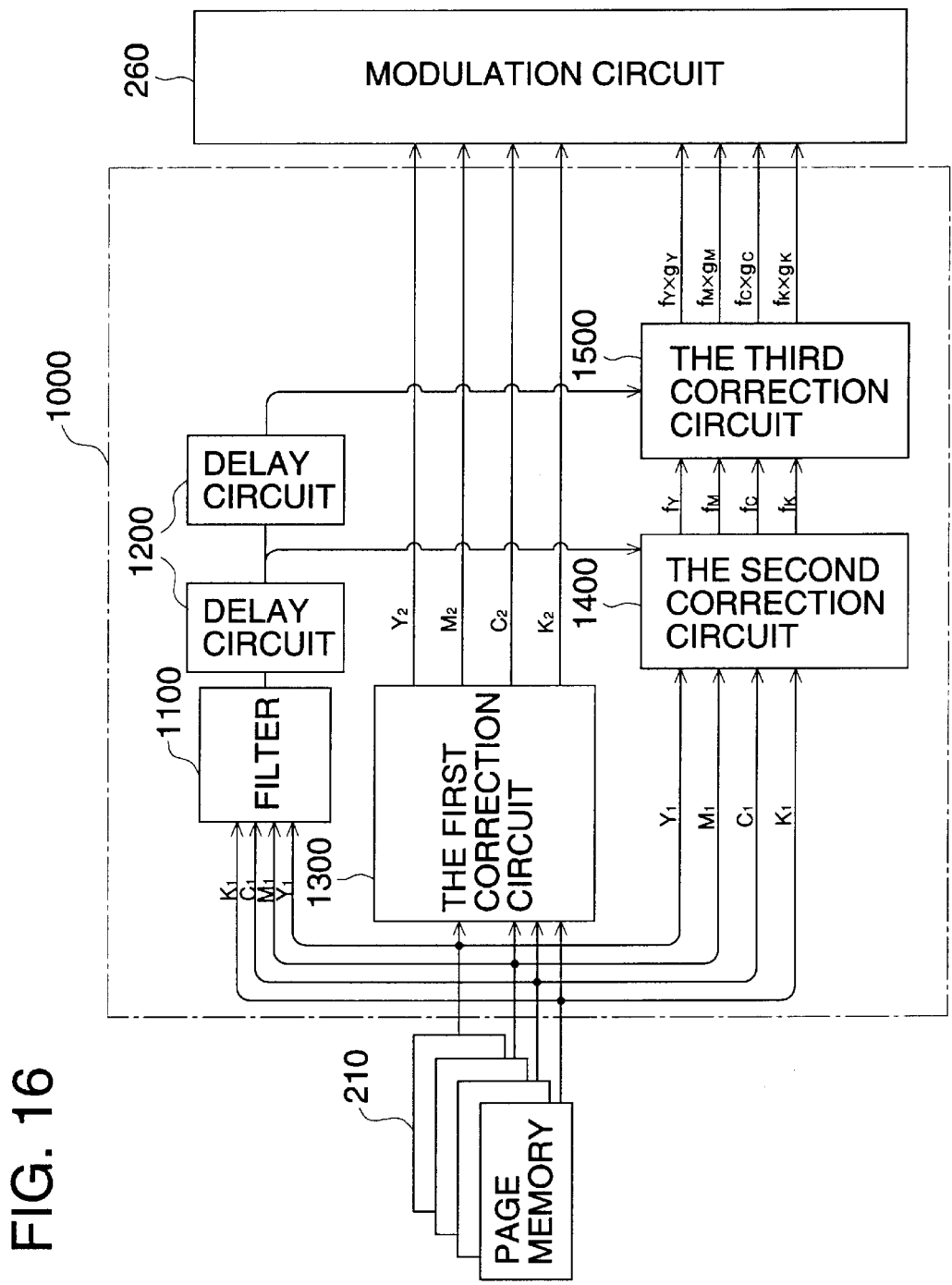
FIG. 16 is a concrete structural view of main portions of the KNC correction circuit.
Figure 17:
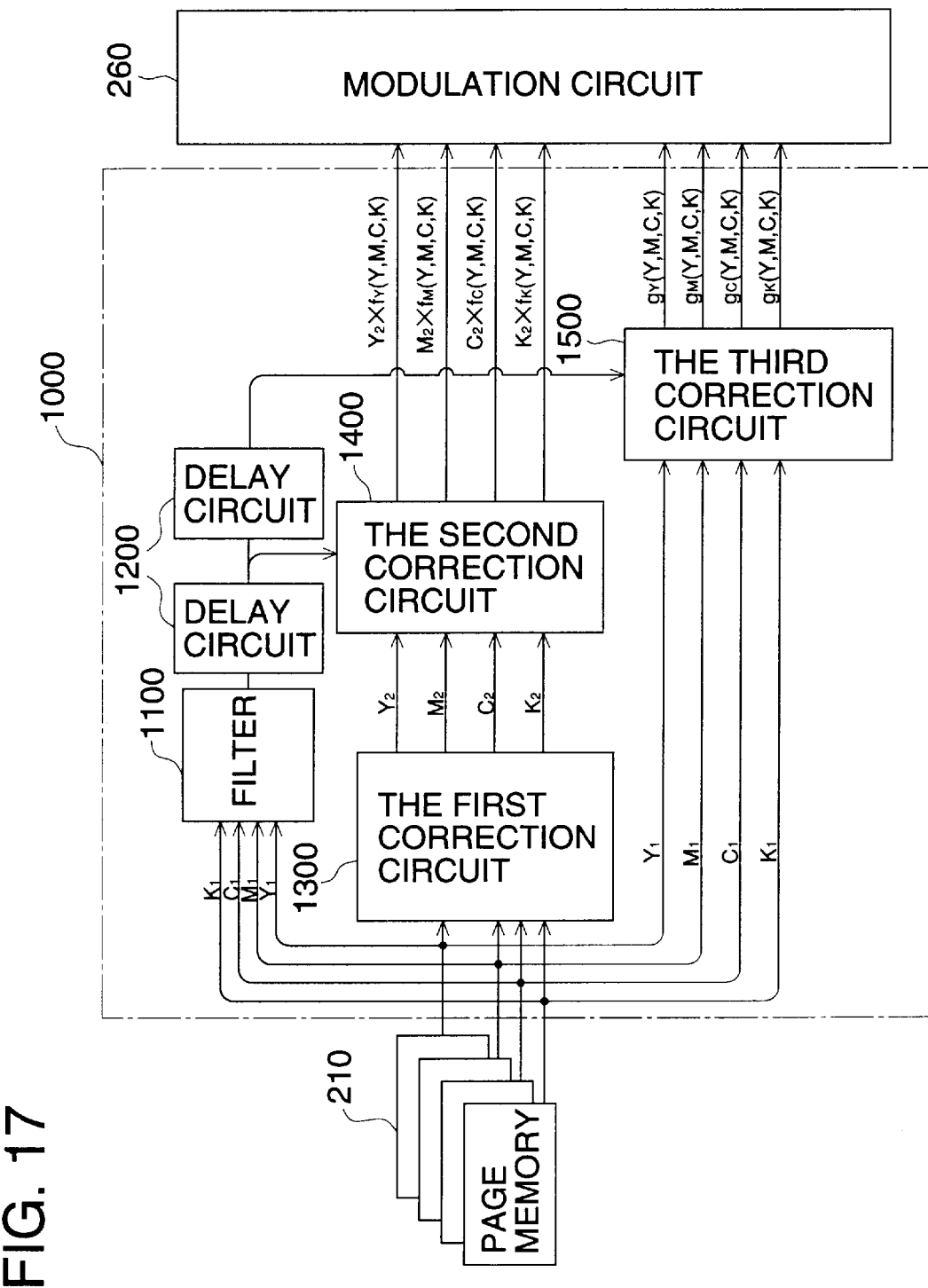
FIG. 17 is a concrete structural view of main portions of the KNC correction circuit.

FIGS. 16 and 17, are block diagrams each showing a concrete structure of the main portion of the KNC correction circuit 1000, shown in FIG. 15.

The KNC correction circuit 1000 has a function, by which the toner adhering condition for each color, necessary for the KNC process, is corrected, from image density data and image density distribution data of each color. Concretely, the image exposure for each color is intensity modulated and pulse width modulated corresponding to image density data and image density distribution data of each color, and in the modulation which is changed corresponding to the condition of toner image superimposition, both of exposure intensity and exposure time of the front and rear stage image exposure are changed at the time of superimposition. The KNC correction circuit 1000 is composed of 3 correction circuits of 1300, 1400, and 1500, in which, as shown in FIGS. 16 and 17, multi-value image density data $D_1$, obtained by linear masking, that is, $Y_1$ data, $M_1$ data, $C_1$ data, $K_1$ data for each color are inputted, and from which corrected recording image data $D_4$, that is, $Y_4$ data, $M_4$ data, $C_4$ data, $K_4$ data for each color are outputted.

In this condition, these correction circuits can be integrated and those having the same function can be formed into 1 circuit. In this case, it is preferable that the correction algorithm is simplified so as to be easily calculated, a look-up table system is adopted, or both are adopted. The first correction circuit 1300 conducts the correction, corresponding to image density of each color, (which corresponds to the correction of an average shift, corresponding to the first phenomenon). The send correction circuit 1400 conducts the correction for the shift due to the structure between images, corresponding to the second phenomenon. The third correction circuit 1500 conducts the correction for the shift between image data and the reproduction image, corresponding to the third phenomenon. As described above, when recording image data $D_4$, on which the KNC correction is conducted, is $Y_4$, $M_4$, $C_4$, and $K_4$, this recording image data is separated and outputted as shown in FIGS. 16 and 17. Then, recording image density data $D_4$ is sent to the MTF correction circuit 232, and is processed.

By using the KNC process in which the exposure optical system is arranged in the image forming body, the image forming body of the transparent base body is used, and the image exposure is conducted from inside of the image forming body, the influence of the light shielding due to the previous toner image or of a spread of the beam diameter due to light scattering, can be eliminated. Further, the correction is conducted for the first and second phenomena, thereby, the superimposition can be improved. Due to this, stable color reproduction can be realized by the above correction of the KNC process.

Concretely describing, different from the external exposure system, the correction corresponding potential characteristics of the image forming body 10 shown in FIG. 5, that is, the correction, not including the correction for light absorption or light scattering, but incorporating the toner layer potential, is conducted. Accordingly, the correction at masking of the first item, and the correction f due to the structure of the previous toner image of the second item, are simplified, and an approximate expression 1+α can be used as the correction factor.

In the correction of the present example, it is shown as the example that, for the convenience of calculation, correction is expressed as a product of the first to the third corrections. In the rear surface exposure, because the degree of correction is decreased, the approximation as the product of the first to third corrections, or the further simplified expression (1) becomes effective.

A filter 1100 is composed of a Laplacean filter, and detects the structure of the toner image. Concretely, it is used for determining the second correction factor and the third correction factor from the calculated value. The second correction factor is a parameter to determine the correction amount in the second correction circuit 1400, and the third correction factor is a parameter to determine the correction amount in the third correction circuit 1500. The filter 1100 finds Laplacean values ΔY, ΔM, ΔC, ΔK for the target pixel, corresponding to the density change of each color, that is, corresponding to the edge effect for each color, and from these values, determines the correction parameter, which is a correction amount for each pixel of each color. Based on this correction parameter, the image density data is corrected. The size of the filter to find the Laplacean value, is a size of a pixel of about 20×20 in the case of 600 dpi, when the edge effect of about 1 mm is generated. The edge effect is different depending on the developing system or the photoreceptor, and therefore, the above-described factors are experimentally determined.

A delay circuit 1200 is delayed by processing time of the first correction circuit 1300, and the second correction amount 1400.

Prior to the explanation of the structure of 3 correction circuits, operations in the KNC correction by the internal exposure system, will be described below.

Figure 22:
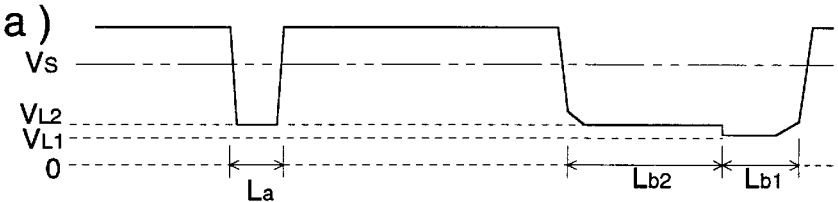
FIGS. 22(a) through 22(e) are diagrams showing an operation of the KNC correction circuit in a color image forming process.
Figure 22:
Figure 22:
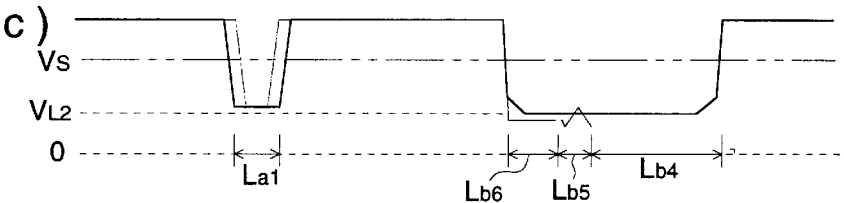
Figure 22:
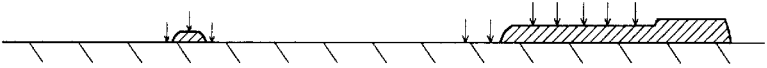
Figure 22:
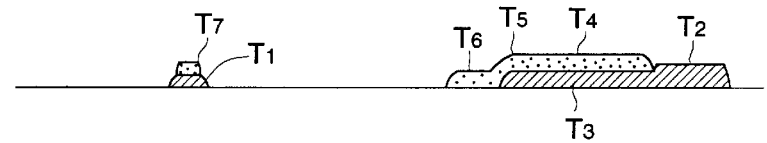

FIG. 22 is a diagram showing operations of the KNC correction circuit 1000 in the color image forming process.

FIG. 22(*a*) is a view showing the relationship of potential under the developing process by the first color toner.

In the first correction circuit 1300 to correct the average slippage between images, image data is corrected so that it is modulated considering a condition of superimposition of the toner image form the each color image density. Accordingly, in also the exposure process by the next color toner, it can be seen that the potential of the positions, at which the latent image $L_a$ is to be formed, and the latent image $L_{b2}$ are formed, is set to be higher than the latent image potential $V_{L1}$ of the latent image $L_{B1}$ on which other color toner is not superimposed, when the latent image potential formed by the exposure process of this time is $V_{L2}$. In the third correction circuit 1500, the correction for the slippage between image data and the reproduction image, is carried out. Accordingly, it can be seen that the exposure amount is controlled so that the edge effect is prevented on the latent image $L_{b1}$ and $L_{b2}$, and the potential is set higher.

FIG. 22(*b*) is a sectional view showing a condition that each latent image is visualized by the first color toner, under the relationship of the potential, shown in FIG. 22(*a*).

The toner images $T_1$, $T_2$, and $T_3$ are, as shown in FIG. 22(*b*), the edge effect is removed by the third correction value, and flat. Further, the toner images $T_1$ and $T_3$ are formed thinner than the toner image $T_2$.

FIG. 22(*c*) shows the relationship of the potential under the developing process by the second color toner.

In the first correction circuit 1300 to correct the average slippage between images, image data is corrected so that it is modulated considering a condition of superimposition of the toner image, form the each color image density. Accordingly, the latent image $L_{b4}$ is set to the potential $V_{L2}$, which is the same potential as that at the last time. At the potions of edges of the latent image $L_{a1}$, the latent image $L_{b6}$, and the latent image $L_{b5}$, the latent image is formed in also the exposure process by the next color toner, and therefore, the strong image exposure is conducted so as to lower the potential. Thereby, potential of the same degree is lowered. This correction has been explained in FIGS. 5 and 6. When the exposure amount is small. The light decay curves of the first color and second color of the image forming body 10 are similar, and when the exposure amount is increased, it is preferable that the correction amount of the second color is increased.

The second correction circuit 1400 corrects the slippage due to the structure between images. When the previous toner image is reproduced corresponding to image data, even if the latent image is formed on the toner image, the latent image is deformed by the edge effect due to the previous toner image, as shown by an arrow, (shown in FIG. 30(*d*) ). By the correction, in order to prevent the edge effect on the latent image $L_{a1}$ and the latent image $L_{b5}$, weak image exposure is conducted on the periphery of $L_{a1}$, strong image exposure is conducted on $L_{a1}$, strong exposure is conducted on the edge of the latent image $L_{b5}$, and weak exposure is conducted on the periphery of $L_{b5}$. This is the correction for $L_{a1}$ and $L_{b5}$.

The third correction circuit 1500 corrects the slippage between image data and the reproduction image. This is a correction process by which the image density data is corrected, and the toner images $T_1$–$T_6$ having no edge effect are formed. This is the same as described above in FIG. 22(*a*).

FIG. 22(*d*) shows the electric field formed on the latent images $L_{b4}$–$L_{b6}$ shown by the line of electric force. It can be seen that all influence due to the halo effect and edge effect are removed.

FIG. 22(*e*) is a sectional view showing a condition that each latent image is visualized by the second color toner under the relationship of the potential shown in FIG. 22(*c*). The edge effect and halo effect of toner images $T_4$–$T_6$ are removed, and the toner images $T_4$–$T_6$ are flat. Further, toner images $T_4$–$T_7$ are formed to be thinner than toner images $T_2$ and $T_6$, in the same manner as $T_1$ and $T_3$. Thus, it is shown that the color balance of the secondary color is corrected, compared with that in FIG. 30(*e*).

An example of the structure of 3 correction circuits 1300–1500 will be more concretely described below.

The first correction circuit 1300 corrects the average slippage between images, and the following circuits may be used.

As the first example of the first correction circuit 1300, a look-up table system to conduct color correction processing by the direct conversion method (hereinafter, simply called the direct conversion method) or a look-up table system to conduct color correction processing by 3 dimensional interpolation method (simply called 3 dimensional interpolation method), can be adopted.

The color collection processing by the direct conversion method is conducted as follows. Generally, the color correction processing is regarded as the simple coordinates-conversion from the color separation signal space to the color correction signal space; color correction signal data corresponding to each color separation signal coordinates is stored in a memory table; and the coordinates-conversion is directly conducted referring to the table.

Referring to FIG. 18, the 3 dimensional interpolation method will be described below.

FIG. 18 is a diagram showing the color correction processing by the 3 dimensional interpolation method. FIG. 18($a$) is a diagram showing division of the color separation signal space in the color correction processing by the 3 dimensional interpolation method. FIG. 18($b$) is a diagram showing an 8-point interpolation method. FIG. 18($c$) is a diagram showing a method of division into a tetrahedron.

In the color correction processing by the 3 dimensional interpolation method, a look-up table system, in which the number of colors of the corresponding table of the color separation signal coordinates and color correction signal data is limited, and for the coordinate-inputs which are not in the table, the 3 dimensional interpolation is conducted using the neighboring known data, and the color correction by the neural network, can be adopted.

In the 3 dimensional interpolation method, the following calculation method is general in which the color separation signal space is separated into a plurality of unit cubes as shown in FIG. 18($a$); optimum color correction signal data in the vertex coordinates of the each unit cube is previously found; and the interpolation is conducted from the 8-vertex data of the belonging unit cube as shown in FIG. 18($b$). Thereby, the required memory capacity which becomes problem in the direct conversion method, can be reduced. Further, in the 3 dimensional interpolation method, there is also a method in which a unit cube is further divided into a plurality of tetrahedrons as shown in FIG. 18($c$), and interpolation is conducted from 4-vertex data of the belonging tetrahedron. Due to these methods, the interpolation calculation can be formed into a type in which a constant item is added to the linear masking method, thereby, the number of adders and multipliers can be reduced, resulting in a reduction of loads of the hardware.

Figure 19:
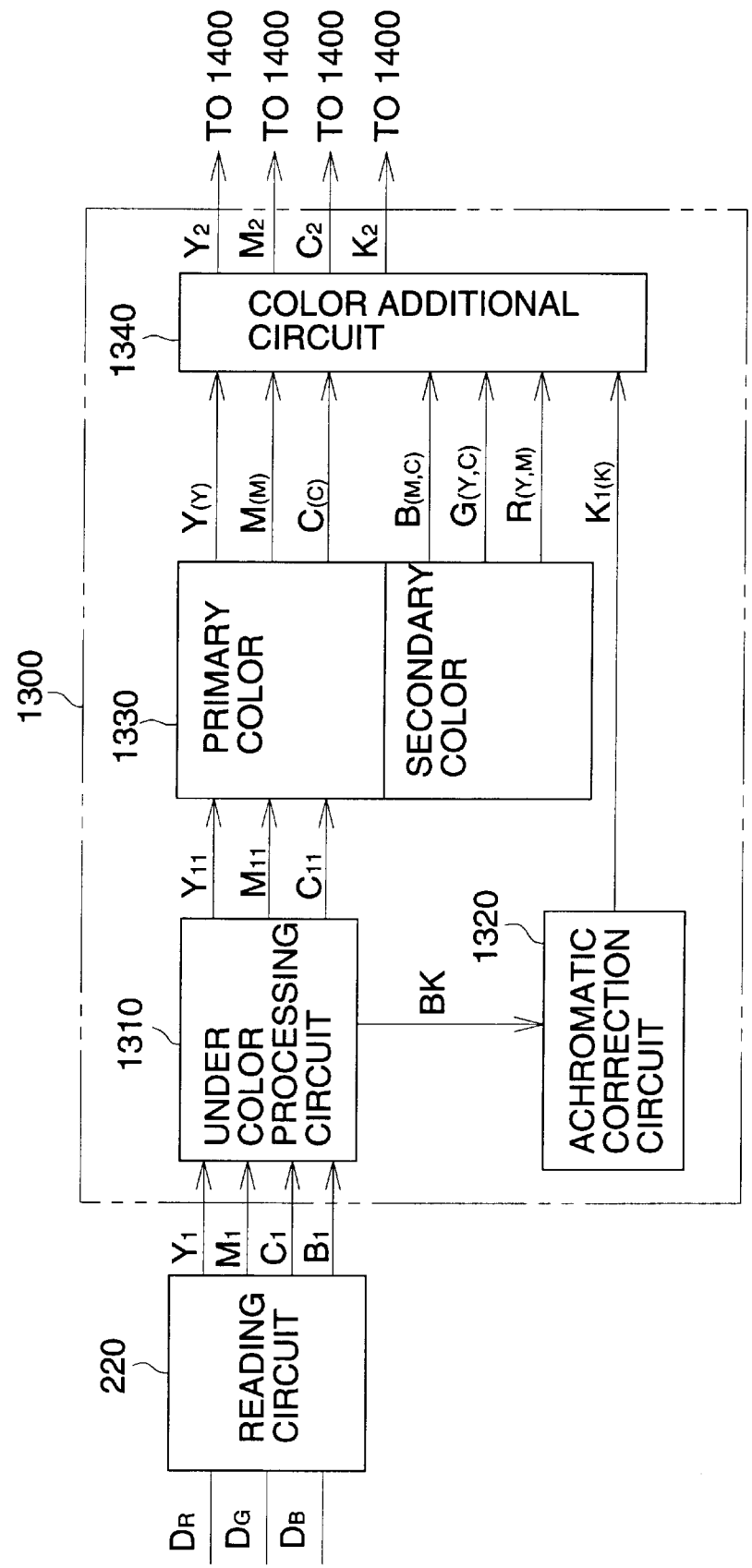
FIG. 19 is a block diagram showing the second example of the first correction circuit in FIGS. 16 and 17.
Figure 20:
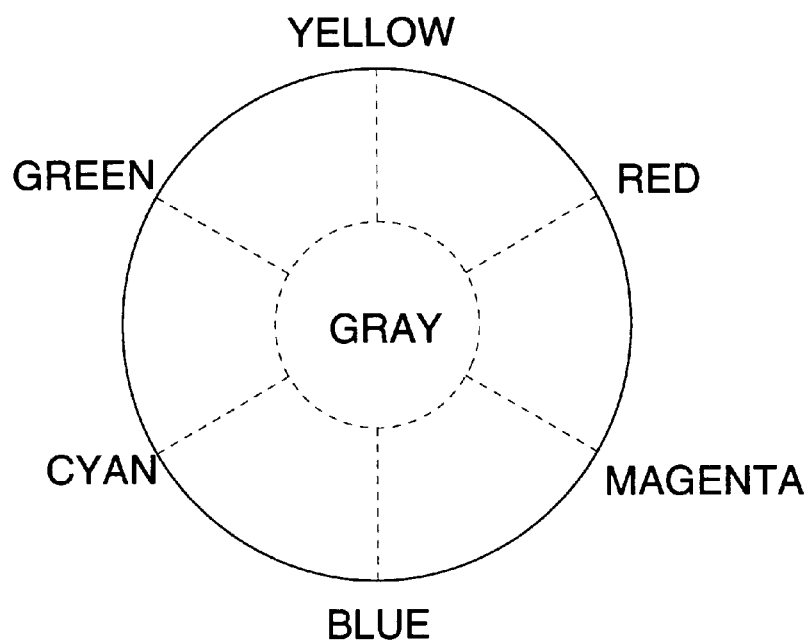
FIG. 20 is a graph showing 7 colors which can be color-separated by the first correction circuit 1300 in the previous image.
Figure 21:
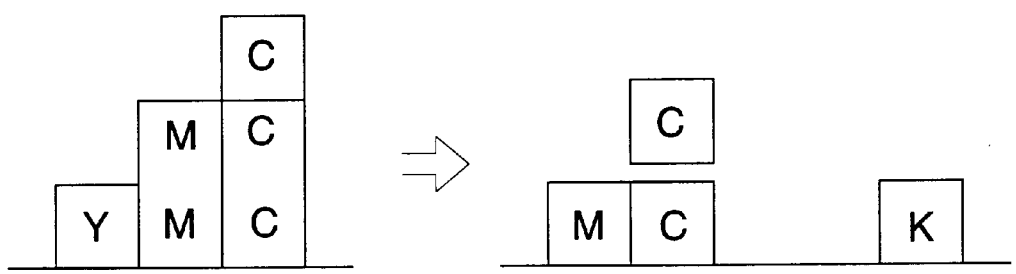
FIG. 21 is a diagram showing a processing operation of a color extraction circuit 1330.

Referring to FIGS. 19–21, the primary structure and functions of the first correction circuit 1300 to correct an average slippage between images, will be explained as the second example of the first correction circuit 1300 below.

FIG. 19 is a block diagram showing the second example of the first correction circuit 1300, shown in FIGS. 16 and 17. FIG. 20 is a graph showing 7 colors, which can be separated in the first correction circuit 1300, of the previous image. FIG. 21 is a diagram showing the processing operation of a color extraction circuit 1330.

The first correction circuit 1300 shown in FIG. 19, corrects the average slippage between images, in the same manner as the first example. Corresponding to the image, expressed by $Y_1$, $M_1$, $C_1$, BK data on which normal masking is conducted, the image data is separated into black K at 100% UCR, the primary color and the secondary color, and after the color correction of the first color and the secondary color is conducted, $Y_2$, $M_2$, $C_2$ and $K_2$ data, which are corrected by mixing black, are outputted. The first color correction circuit 1300 is structured by an under-color processing circuit 1310, achromatic color correction circuit 1320, color extraction circuit 1330, and color addition circuit 1340.

The under color processing circuit 1310 extracts black component BK at 100% UCR value from $Y_1$, $M_1$, $C_1$, $B_1$ data after normal masking processing, sends it to the achromatic color correction circuit 1320, and sends $Y_{11}$, $M_{11}$, $C_{11}$ data after UCR processing, to the color extraction circuit 1330.

The color extraction circuit 1330 separates $Y_{11}$, $M_{11}$, $C_{11}$ data into the primary color Y, M, C and the secondary color B, G, R, as shown in FIG. 21, and corrects them so that red, magenta, blue, cyan, green, and yellow coincide with the reproduction colors, and after that, sends to the color addition circuit 1340. As shown in FIG. 20, the primary color is the color of Y, M, C color toners. The secondary color is the color obtained by adding the primary color Y, M, C, and B is obtained by adding G to R. G is obtained by adding Y to C. R is obtained by adding Y to M. Gray is obtained by adding the primary color Y, M, C at the same ratio, and is separated from the under color processing circuit 1310 by 100% UCR. This correction is conducted such that $Y_2$ data is reduced, and $M_2$ data is increased, for example, when red is color-slipped by superimposition of Y and M. Due to this, the exposure amount is corrected, and the thickness of each color toner layer to be superimposed, can be the same, as is explained referring to FIG. 22.

The color addition circuit 1340 selects the correction value so that the boundary of color phase, shown by a dotted line in FIG. 20, for example, red, magenta, blue, cyan, green, and yellow coincide with the reproduction colors, and sends $y_2$, $M_2$, $C_2$, $K_2$ data of the primary color.

In the correction explained by the first example and the second example of the above-described first correction circuit 1300, toner layers are superimposed. That is, the correction at the solid image area is conducted, however, it is not the correction for the image structure such as an edge between the previously formed toner images or the succeedingly formed toner images, the peripheral portion, isolated points, or lines. Accordingly, as the correction for the structure of the image, the second correction circuit 1400 is necessary.

In the second correction circuit 1400, when its function is expressed as the function f, f is generally expressed as follows: $f_Y(Y, M, C, K)$, $f_M(Y, M, C, K)$, $f_C(Y, M, C, K)$, $f_K(Y, M, C, K)$, which are originally determined from the density changes of each color image density data Y, M, C, K. However, because only the influence of the previously formed toner image may be considered, when the function f is simplified by considering that there is no difference due to toner colors, each f is expressed as follows, when the development order is Y→M→C→K: $f_Y=1$, $f_M=1+\alpha_Y$, $f_C=1+\alpha_{Y+M}$, $f_K=1+\alpha_{Y+M+C}$.

In the third correction circuit 1500, when its function is expressed as the function g, g is generally expressed as follows: $g_Y(Y, M, C, K)$, $g_M(Y, M, C, K)$, $g_C(Y, M, C, K)$, $g_K(Y, M, C, K)$, which are independently determined from the density changes of image density data Y, M, C, K for each color. Because the influence of the previously formed toner image is not considered, there is no difference due to toner colors. When the function g is simplified, the function of the third correction circuit 1500 can be expressed by expressing the correction of slippage of each color between image data Y, M, C, K and the reproduction image as follows: $g_Y=(1+\beta_Y)$, $g_M=(1+\beta_M)$, $g_C=(1+\beta_C)$, $g_K=(1+\beta_K)$. Herein, because there is no correction of interference between toner images, the correction factor $1+\beta$ is used, which is determined from Laplacean values obtained from image density data of each color.

When the first–third corrections $D_4=D_2 \times f \times g$ are further simplified, the expression (1) is obtained.

$$Y_4=Y_2 \times 1 \times (1+\beta_Y)$$

$$M_4=M_2 \times (1+\alpha_Y) \times (1+\beta_M)$$

$$C_4=C_2 \times (1+\alpha_{Y+M}) \times (1+\beta_C)$$

$$K_4=K_2 \times (1+\alpha_{Y+M+C}) \times (1+\beta_K)$$

Expression (1)

In the present example, the image density data Y4, M4, C4, K4, shown in Expression (1), is divided into intensity modulation data and pulse width data.

The Expression (1) shows the KNC correction when development is conducted in the order of Y, M, C, K. Although the order of development is limited to Y→M→C→K in the Expression, the present invention is not limited to this. For example, K→C→M→Y, K→Y→M→C, or the like is also possible. In these case, correction factors are correspondingly changed.

The first row recording image data $Y_2$, $M_2$, $C_2$, $K_2$ is the image density data in which an average slippage between images is previously corrected.

The second row is a correction term to correct the slippage by the structure between images, in which only the influence of the previous image is considered, and the slippage due to the succeeding image is not corrected for simplification. This second term is originally $f_Y$ (Y, M, C, K), $f_M$ (Y, M, C, K), $f_C$ (Y, m, C, K), $f_K$ (Y, M, C, K).

The third row is a correction term to correct the slippage between image data and reproduction image. In this term, $\alpha$, f, and $\beta$ are variables to show the density distribution of each color toner, which are formed of the Laplacean filter multiplied by a factor, or a corresponding table which is made experimentally. These first–third rows are corresponding to the above-described first–third correction.

The third correction circuit 1500 corrects the slippage between image data and the reproduction image, and therefore, this correction circuit 1500 may be replaced with only the MTF correction circuit 232, or γ correction circuit 233.

Further, in addition to this, the above Expression is made as a look-up table system, and thereby, image data can also be corrected.

As a method, by which data to be sent from the KNC correction circuit 1000 to modulation circuits 260A, 260B, 260C, and 260D, is allotted to the intensity modulation and pulse width modulation, there is Table 3, or the like, formed by a combination of outputs from the first correction circuit 1300—the third correction circuit 1500. Example 1 shown in Table 3 corresponds to the KNC correction circuit 1000 shown in FIG. 16, and Example 2 shown in Table 3 corresponds to the KNC correction circuit 1000 shown in FIG. 17.

TABLE 3

|  | Data corresponding to pulse width modulation (exposure width modulation) | Data corresponding to intensity modulation (exposure intensity modulation) |
| --- | --- | --- |
| Example 1 | (1) | (2) (3) |
| Example 2 | (1) (2) | (3) |
| Example 3 | (1) (3) | (2) |
| Example 4 | (2) | (1) (3) |
| Example 5 | (2) (3) | (1) |
| Example 6 | (3) | (1) (2) |

In Table 3, data corresponding to the pulse width means that the exposure width, that is, the area of the latent image is modulated, and data corresponding to the intensity modulation in Table 3 means that the exposure intensity, that is, the potential of latent image is modulated.

In Table 3, (19 shows output data d2 from the first correction circuit 1300, that is, $Y_2, M_2, C_2, K_2$, (2) shows the correction output data from the second correction circuit 1400, $f_Y$ (Y, M, C, K), $f_M$ (Y, M, C, K), $f_C$ (Y, M, C, K), $f_K$ (Y, M, C, K), and (3) shows the correction output data from the third correction circuit 1500, $g_Y$ (Y, M, C, K), $g_M$ (Y, M, C, K), $g_C$ (Y, M, C, K), $g_K$ (Y, M, C, K).

The KNC correction circuit 1000 shown in FIG. 16, separates image data into data $D_2$ corresponding to the pulse width, that is, $Y_2, M_2, C_2, K_2$, and data corresponding to the intensity modulation, that is, $f_Y$ (Y, M, C, K)×$g_Y$ (Y, M, C, K), $f_M$ (Y, M, C, K)×$g_M$ (Y, M, C, K), $f_K$ (Y, M, C, K)×$g_K$ (Y, M, C, K), by the combination shown in Table 3, and sends them to the modulation circuits 260A, 260B, 260C, 260D.

The KNC correction circuit 1000 shown in FIG. 17, separates image data into data $D_2 \times f$ corresponding to the pulse width, that is, $Y_2 \times f_Y$ (Y, M, C, K), $M_2 \times f_M$ (Y, M, C, K), $C_2 \times f_C$ (Y, M, C, K), $K_2 \times f_K$ (Y, M, C, K), and data corresponding to the intensity modulation, that is, $g_Y$ (Y, M, C, K), $g_M$ (Y, M, C, K), $g_C$ (Y, M, C, K), $g_K$ (Y, M, C, K), by the combination shown in Table 3, and sends them to the modulation circuits 260A, 260B, 260C, and 260D.

TABLE 4

|  | Data corresponding to pulse width (exposure width) | Data corresponding to intensity modulation (exposure intensity) |
| --- | --- | --- |
| Example 1 | $D_2$ | $(1 + \alpha)(1 + \beta)$ |
| Example 2 | $D_2 (1 + \alpha)$ | $(1 + \beta)$ |
| Example 3 | $D_2 (1 + \beta)$ | $(1 + \alpha)$ |
| Example 4 | $(1 + \alpha)$ | $D_2 (1 + \beta)$ |
| Example 5 | $(1 + \alpha)(1 + \beta)$ | $D_2$ |
| Example 6 | $(1 + \beta)$ | $D_2 (1 + \alpha)$ |

Table 4 more concretely shows Table 3 using the simplified Expression (1), and the KNC correction circuit 1000. makes each color recording image data so that toner images are superimposed according to multi-value image density data and the image density distribution of each color. Then, multi-value recording image density data on which the KNC correction is conducted, is sent to the modulation circuits 260A, 260B, 260C, and 260D. $D_2$ shows then first row of Expression (1), and corresponds to (1) in Table 3. The term $(1+\alpha)$ shows the second row of Expression (1), and corresponds to (2) in Table 3. The term $(1+\beta)$ shows the third row of Expression (1), and corresponds to (3) in Table 3. Symbols $D_2$, $\alpha$, $\beta$ have been described above, so explanation will be omitted.

Figure 23:
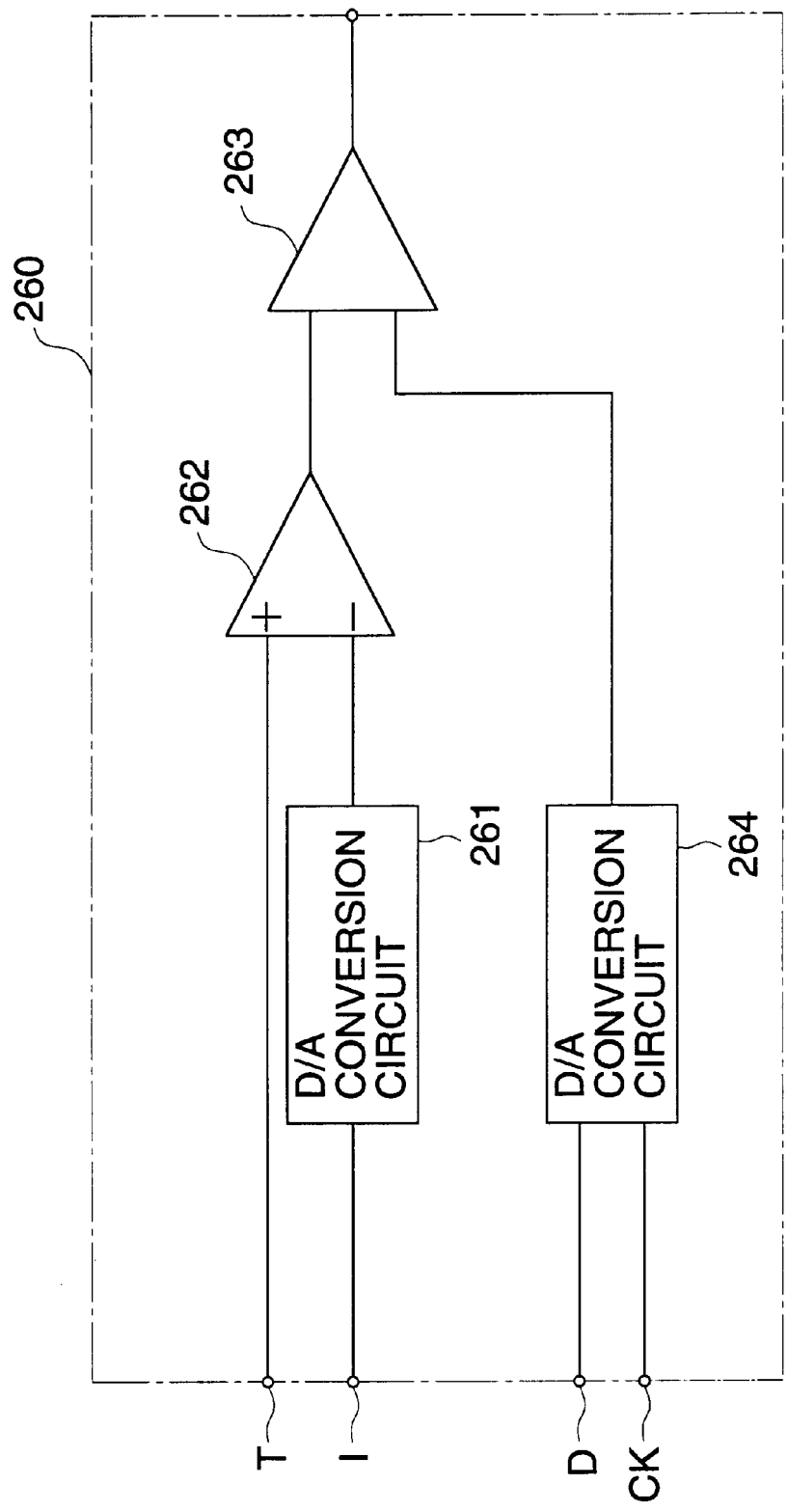
FIG. 23 is a block diagram showing a modulation circuit in the present example.

FIG. 23 is a block diagram showing the modulation circuit of the present example.

The modulation circuits 260A, 260B, 260C, 260D have the same structure as shown in FIG. 23, and each has a D/A conversion circuit 261, comparator 262, differential amplifier 263, D/A conversion circuit 264, input section T of the standard triangular wave $\phi_0$ or a triangular wave whose phase is delayed by each ⅙ period, and data corresponding to the pulse width, input section D of data corresponding to the intensity modulation, and input section CK of the standard clock $DCK_0$. The data corresponding to the intensity modulation, as shown in Table 3 or Table 4, is synchronized with the standard clock $DCK_0$, and is D/A converted by the D/A conversion circuit 264. On the other hand, the triangular wave, inputted from the selection circuits 250A, 250B, 250C, 250D, generates uniform pulse width signals when the reference wave is inputted into + terminal of the comparator 262, and a threshold value to cross the predetermined reference wave is used. That is, the threshold signal is applied to—input terminal of the comparator 262, and is compared to the reference wave, and the pulse width modulation signal is obtained. Next, the pulse width modulation signal and data from the input section D are amplified by the differential amplifier 263, and the intensity modulated pulse width signal is obtained.

Figure 24:
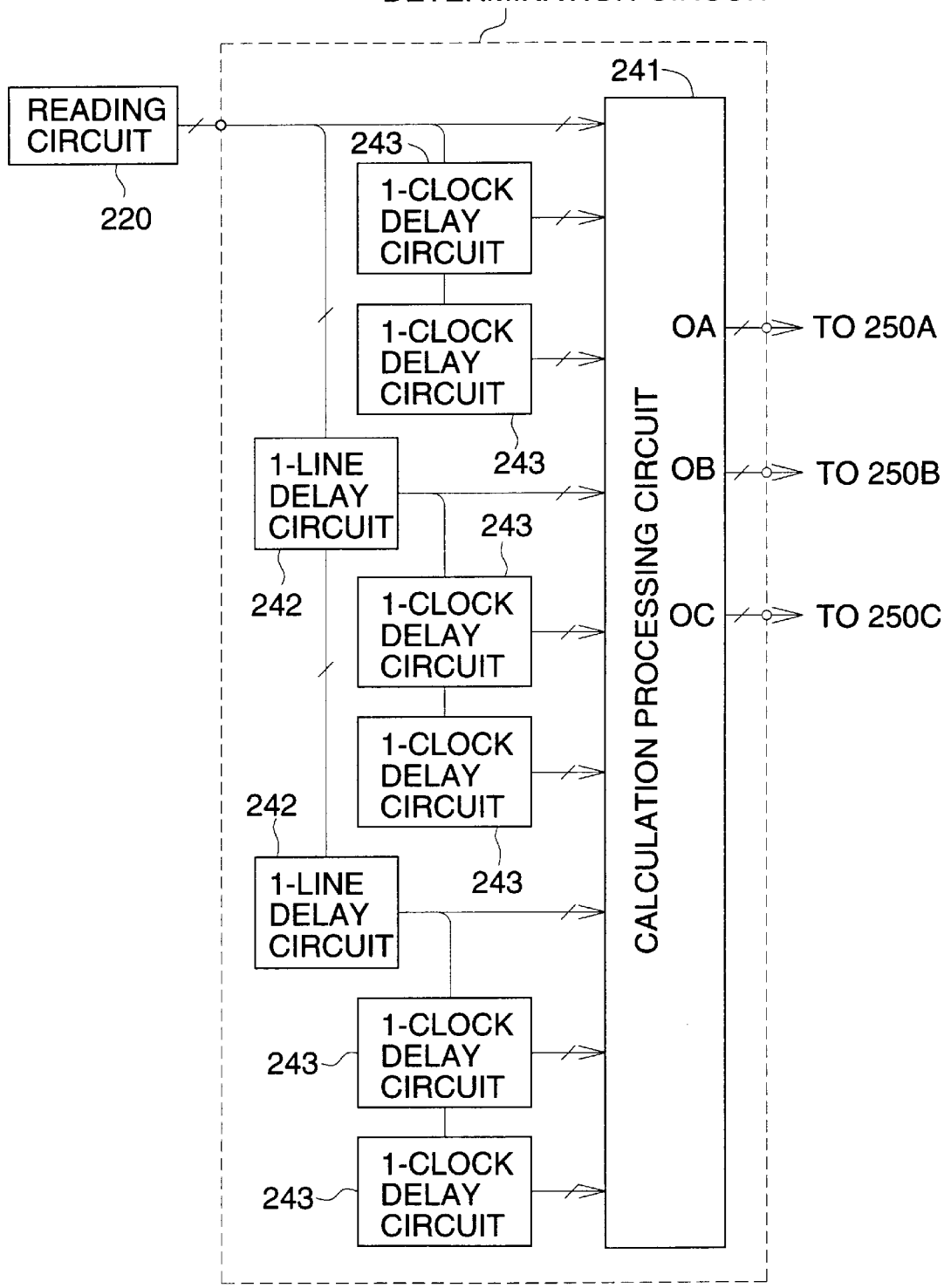
FIG. 24 is a block diagram showing a reference wave phase determination circuit in the present example.

FIG. 24 is a block diagram showing the reference wave phase determination circuit of the present example.

A reference wave phase determination circuit 240 is composed of a 1-line delay circuit 242, 1-clock delay circuit 243, and calculation processing circuit 241. By the 1-line delay circuit 242, the first1 scanning line image density data of 3 scanning line image density data, in which image density data is sent 1 by 1 scanning line, is delayed by 2-line scanning time, and image density data of the intermediate 1 scanning line is delayed by 1 line scanning time (image data of the last 1 scanning line is not delayed). Further, each image data is delayed by 2 standard clock or 1 standard clock by 1-clock delay circuit 243, and all image density data of the pixel adjoining the target pixel, including the target pixel, are simultaneously sent to the calculation processing circuit 241. The calculation processing circuit 241 adds image density data of each small scanning line to the sent data, and calculates the center of gravity of density data in the 1-original pixel. According to the center of gravity, selection signals, which are respectively different as follows, are outputted from the output terminal 0 to selection circuits 250A, 250B, 250C, 250D.

Modulating operations in the image processing circuit of the present example will be described below in relation to the reference wave phase determination circuit.

Initially, operations in the reference wave phase determination circuit 240 will be described.

Figure 25:
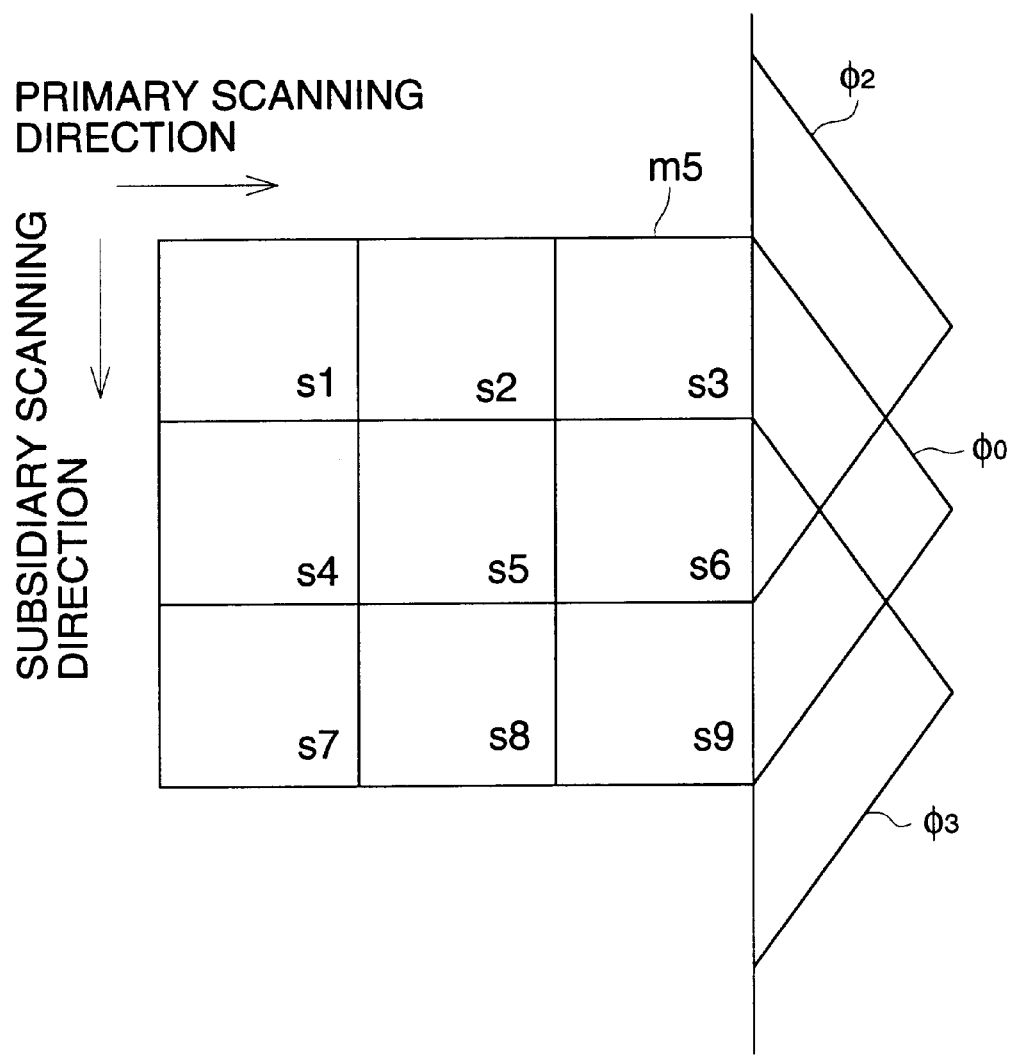
FIG. 25 is a view showing an example of the relationship between triangle waves having different phases, and a target pixel.
Figure 26:
FIGS. 26(a) and 26(b) are diagrams showing adjoining pixels when the target pixel m5 is divided into 3×3.

FIG. 25 is a view showing an example of the relationship between the triangular wave having different phase and the target pixel. FIG. 26(a) is a plan view, in which th target pixel is m5, adjoining pixels including the target pixel m5 are expressed as m1–m9, when the target pixel m5 is divided into 3×3. FIG. 26(b) is an enlarged view showing the case where each small portion is expressed by s1–s9 when the target pixel m5 is divided into 3×3. Herein, m1–m9, and s1–s9 express density of that portion.

The calculation processing circuit 241 conducts RE processing and obtains density data of the small pixel. The density data of this small pixel is divided into a small scanning line including s1, s2, s3, . . . , a small scanning line including s4, s5, s6, . . . , and a small scanning line including s7, s8, s9, . . . , in the primary scanning direction. These 3 small scanning lines of the small pixel corresponds to one original pixel. The calculation processing circuit 241 calculates the center of gravity of the density data in 1-original pixel of each small scanning line, and according to the center of gravity, selection signals, which are respectively different as follows, are outputted from the output terminal 0 to the selection circuits 250A, 250B, 250C, 250D.

That is, the calculation processing circuit 241 adds the density of s1, s2, s3 (the first small scanning line) of the pixel m5, adds the density of s4, s5, s6 (the second small scanning line) of the pixel m5, and adds the density of s7, s8, s9 (the third small scanning line) of the pixel m5, and from these added values, detects the center of gravity of the original pixel. When the calculation processing circuit 241 detects that the center of gravity of the pixel m5 is near the second small scanning line, it selects the reference triangular wave $\phi_0$, which is shown in FIG. 25 and has no phase deviation, and outputs it. When the calculation processing circuit 241 detects that the center of gravity of the pixel m5 is near the boundary of the second small scanning line and the first small scanning line, it selects the triangular wave $\phi_1$, which is shown in FIG. 25 and has the phase delayed by ⅙ period, and outputs it. When the center of gravity of the pixel m5 is near the center of the first small scanning line, the calculation processing circuit 241 selects the triangular wave $\phi_2$, whose phase is delayed by ⅖ period, and outputs it. When the center of gravity of the pixel m5 is near the boundary of the second small scanning line and the third small scanning line, selects the triangular wave $\phi_1$, which is shown in FIG. 25 and has the phase delayed by ⅙ period, the calculation processing circuit 241 selects the triangular wave $\phi_3$, whose phase is advanced by ⅙ period, and outputs it. When the center of gravity of the pixel m5 is near the third small scanning line, the calculation processing circuit 241 outputs a signal to select the reference triangular wave $\phi_4$, whose phase is advanced by ⅖ period, from the output terminal 0 to the selection circuits 250A, 250B, 250C, and 250D.

Next, referring to FIG. 27, the RE processing will be described.

FIG. 27 is a diagram showing an example when the target pixel m5 is divided into 3×3, and P=0.5. FIG. 27(a) is a diagram showing an example of the density distribution of adjoining pixels including the target pixel m5. FIG. 27(b) is a diagram showing the density distribution in the target pixel m5 which is calculated by setting P=0.5.

When taking the case where the target pixel m5 is divided into 3×3 small pixels, as an example, the density of a small pixel si is determined by the following expression.

$$si = (9 \times m5 \times P \times mi/A) + (1-P) \times m5$$

where, i=1, 2, . . . 9, P is constant, which is regarded as the intensity of the RE processing, and a value within 0.1–0.9 is used. A is the sum total of m1–m9.

In the above expression, the term $(9 \times m5 \times P \times mi/A)$ is a term in which the density of the target pixel m5 is multiplied by P, and the product is allotted corresponding to the ratio of density of adjoining pixels. The term $(1-P) \times m5$ is a term in which the remaining density of the target pixel m5 is equally allotted to each small pixel, and a component of a blur is adopted.

Next, referring to FIGS. 28 and 29, the image exposure operation in the modulation circuits 260A, 260B, 260C, 260D will be described.

Figure 28:
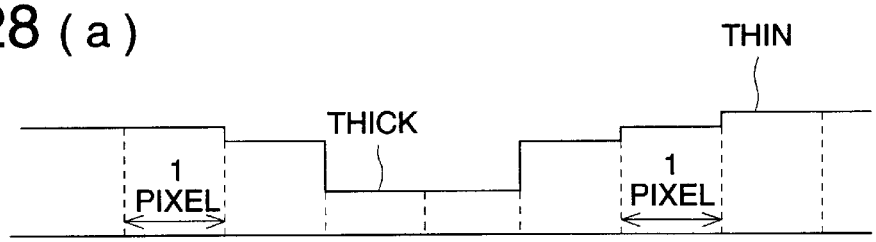
FIGS. 28(a) through 28(f) are time charts showing a signal of each portion of a modulation signal generation circuit when recording position modulation is carried out.
Figure 28:
Figure 28:
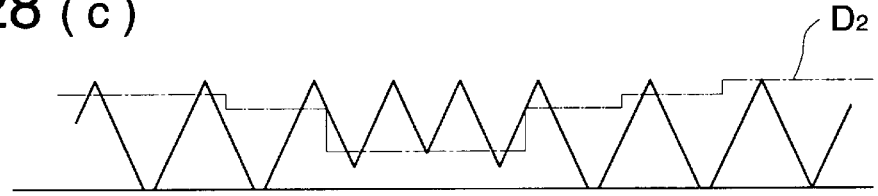
Figure 28:
Figure 28:
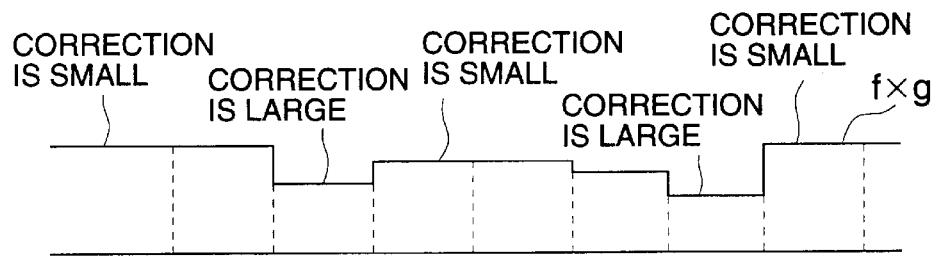
Figure 28:
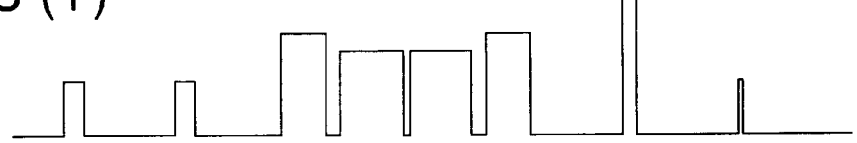

Referring to FIG. 28, the operation of the modulation circuits 260A, 260B, 260C and 260D in the case where image density data D2 is included in data corresponding to the pulse width, as shown in FIG. 16, will be described below.

FIGS. 28(a)–28(f) are time charts showing signals of each section of the modulation signal generation circuit in the case of recording position modulation.

In FIG. 28, (a) shows a part of analog converted data, in which $Y_2$, $M_2$, $C_2$, $K_2$ data of image density data $D_2$, sent based on the standard clock $DCK_0$, using the index signal as a trigger, from the slippage correction circuit 1300, in which slippage occurs due to the previous image, is converted into an analog value by the D/A conversion circuit 261. Thinner density is shown in the higher level side, and thicker density is shown in the lower level side.

FIG. 28(b) shows a triangular wave, which is a selected reference wave, successively outputted from the selection circuits 250A, 250B, 250C and 250D, and including a delayed wave.

FIG. 28(c) shows an input signal of the comparator 262, which is the same as in FIG. 28(a) and FIG. 28(b).

FIG. 28(d) shows a pulse width signal which is generated as follows: in order to transform a triangular wave, shown in FIG. 28(b), into a pulse width signal, DC voltage is generated inside by the standard signal generator 261, and is compared by the comparator 262 and is generated. This pulse width signal is an input signal into one input terminal of the differential amplifier 263.

FIG. 28(e) shows correction data determined from peripheral pixels of the target pixel, data f×g, or $(1+\alpha) \times (1+\beta)$, corresponding to the intensity modulation shown in Table 3 or Table 4. This signal is an input signal into the other input terminal of the differential amplifier 263.

FIG. 28(f) shows an intensity modulated pulse width signal from the differential amplifier 263, by which the difference between 2 input signals, shown in FIGS. 28(d) and 28(e), is amplified. Thus obtained modulation signal is sent to the scanning circuit 300, and an LED array is emitted.

Due to the result of the modulation signal generation, in the character area, the recording position modulation is conducted by which a position of n-line small dots in the target pixel is moved from density data of the original adjoining pixel to a position along the direction of line of the original character or line image. As a result, characters and images are clearly reproduced. The recording position modulation is conducted on only the black component in order to prevent the color tone from changing, in the half tone area, and on the other color components, the modulation is conducted by the triangular wave having no phase displacement.

Further, when the phase of reference wave is successively shifted in the subsidiary scanning direction, dots corresponding to screen-angled half tone dots can be structured. For example, when the screen angle is 45° in yellow component, 26.6° in magenta component, −26.6 in cyan component, and 0° in black component, uniformity of color reproduction is increased, and the moire stripe can be prevented from generating.

Especially, when the black component is 0°, there is an advantage that the recording phase modulation means can be used without being changed.

Figure 29:
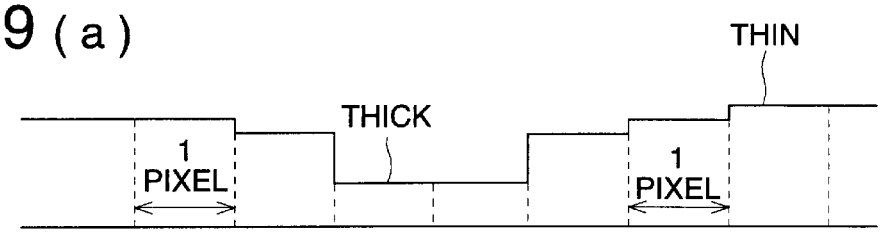
FIGS. 29(a) through 29(f) are time charts showing a signal of each portion of a modulation signal generation circuit when recording position modulation is carried out.
Figure 29:
Figure 29:
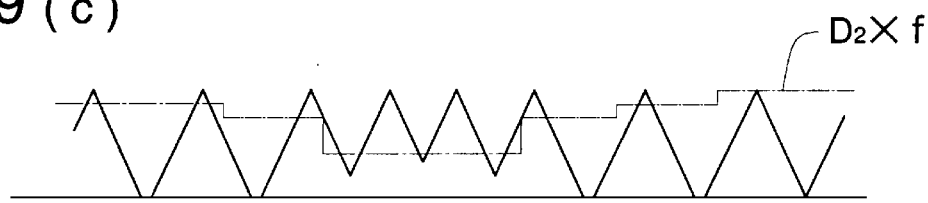
Figure 29:
Figure 29:
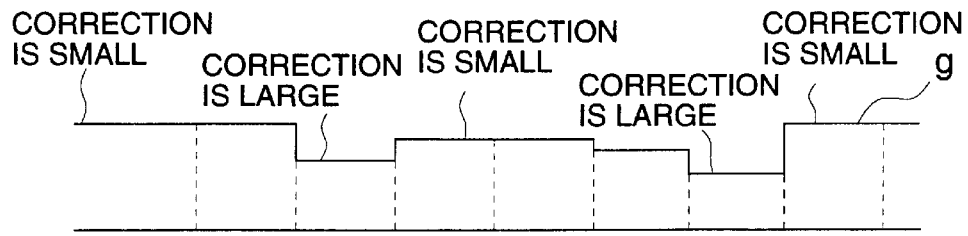
Figure 29:
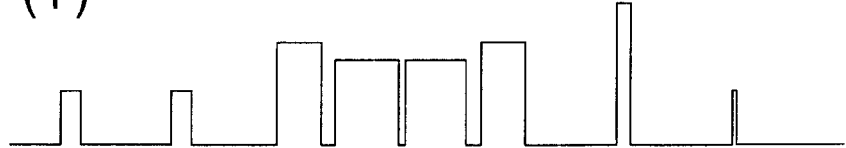

Referring to FIG. 29, operations of the modulation circuits 260A, 260B, 260C, 260D, when, as shown in FIG. 17, the image density data D2 and the correction f are included in data corresponding to the pulse width modulation, will be described below.

FIGS. 29(a)–29(f) are time charts showing signals in each section of the modulation signal generation circuit when the recording position modulation is conducted.

In FIG. 29, (a) shows $D_2 \times f$, and shows a part of analog converted data, in which $Y_2$, $M_2$, $C_2$, $K_2$ data of image density data $D_2$, sent based on the standard clock $DCK_0$, using the index signal from the slippage correction circuit 1300 as a trigger, in which slippage occurs due to the previous image, is multiplied by f, and after that, it is converted into an analog value by the D/A conversion circuit 261. Thinner density is shown in the higher level side, and thicker density is shown in the lower level side.

That is, (a) is data corrected corresponding to the pulse modulation shown in Table 3 or Table 4, that is, $D_2 \times f$ or $D_2 \times (1+\alpha)$, and as a result that correction of the slippage due to the previous image is conducted on $D_2$, it is shown that this correction is larger on a portion in which density change is larger, and as a corrected result, it is shown that the higher level side is recorded in the lower density, and the lower level side is recorded in the higher density. This signal is an input signal to one input terminal of the comparator 262.

FIG. 29(b) shows a triangular wave, which is a selected reference wave, successively outputted from the selection circuits 250A, 250B, 250C and 250D, and including a delayed wave.

FIG. 29(c) is an input signal to the comparator 262, one-dotted chain line $D_2 \times f$ is shown in FIG. 29(a), and the triangular wave shown by a solid line is the signal shown in FIG. 29(c).

FIG. 29(d) shows an output signal from the comparator 262, which is a pulse width signal, generated as follows: in order to transform a triangular wave, shown in FIG. 29(b), into a pulse width signal, DC voltage is generated inside by the D/A conversion circuit 261, and is compared by the comparator 262, and the pulse width signal is generated. This pulse width signal is an input signal into one input terminal of the differential amplifier 263.

FIG. 29(e) shows a part of analog converted data, in which intensity modulation data composed of g or $1+\beta$, sent based on the standard clock $DCK_0$, using the index signal as a trigger, from the slippage correction circuit 1300, in which slippage occurs due to images, is converted into an analog value by the D/A conversion circuit 261. This signal is an input signal to the differential amplifier 263.

FIG. 29(f) shows an intensity modulated pulse width signal from the differential amplifier 263, by which the difference between 2 input signals, shown in FIGS. 29(d) and 29(e), is amplified. Thus obtained modulation signal is sent to the scanning circuit 300, and an LED array is emitted.

According to the color image forming apparatus 400 of the present example, even when a spot light is irradiated on the toner image according to a digital signal, a dot-like electrostatic latent image, having high sharpness and no fringe, is formed. As a result, a toner image having high sharpness can be obtained, and when correction is carried out by considering the image density distribution when toner images are superimposed, the quality of color reproduction of edges, fine lines, isolated points, etc., can be increased.

Incidentally, in the present example, as a result that the factor P of the RE processing id variously changed for experiments, a good image can be obtained in the range of P of 0.1–0.9. However, when P is small, the sharpness of characters is insufficient, and when P is large, edge portions of characters or line images is excessively emphasized. From this result, it is found that the range of a preferable value of P is 0.3–0.7. Due to this, when the document is characters or line images, the edge portion is sharply reproduced, and even in the case of small characters, the detailed portion of them can be reproduced. Further, in also the case of halftone of the picture, or the like, bad influence does not occur. This is for the reason that, in this method, the influence of the value of P is small on the half toner image.

In the present invention, although P can be used as a constant, it is preferable that P is changed corresponding to images (character area, or half toner area). When the value of P on the character area is P1, and the value of P on the half toner area is P2.

P1>P2 is preferable. That is, when the image is characters, it is preferable that the value of P is large, preferably, 0.9–0.4, and when the image is half tone, the value of P is small, that is, 0.6–0.1.

Incidentally, in the present example, as a result that the factor P of the RE processing is variously changed for experiments, a good image can be obtained in the range of P of 0.1–0.9. However, when P is small, the sharpness of characters is insufficient, and when P is large, edge portions of characters or line images is excessively emphasized. From this result, it is found that the range of a preferable value of P is 0.3–0.7. Due to this, when the document is characters or line images, the edge portion is sharply reproduced, and even in the case of small characters, the detailed portion of them can be reproduced. Further, in also the case of halftone of the picture, or the like, bad influence does not occur. This is for the reason that, in this method, the influence of the value of P is small on the half toner image.

In the present invention, although P can be used as a constant, it is preferable that P is changed corresponding to images (character area, or half toner area). When the value of P on the character area is P1, and the value of P on the half toner area is P2.

P1>P2 is preferable. That is, when the image is characters, it is preferable that the value of P is large, preferably, 0.9–0.4, and when the image is half tone, the value of P is small, that is, 0.6–0.1.

Although the flow of image data is explained as a printer, which outputs data temporarily stored in the page memory 210, the present invention is not limited to that. When the image data processing circuit 100 is replaced with an image data processing circuit 150 composed of a color scanner 151, A/D conversion circuit 152, density conversion circuit 153, linear masking circuit 154, etc., which is a circuit, into which image density data from the scanner is inputted, and in which image processing is carried out, the present example can also be applied to other image forming apparatus such as a copying apparatus.

The Second Example

In the first example, each correction term is allotted to the pulse width modulation and intensity modulation, however, the same effect can be obtained by the following method: the outline structure of the color image forming apparatus is almost the same as that of the first example; the function of the KNC correction circuit 1000 is mixed between the pulse width modulation and the intensity modulation as shown in Table 4, and pulse width modulation and intensity modulation are carried out.

$$Y_4 = Y_2 \times 1 \times (1 + \beta_Y) \quad \text{[Expression 2]}$$

$$M_4 = M_2 \times \frac{(1 + \alpha_Y)}{(1 + \alpha_Y)\gamma^1} \times \frac{(1 + \alpha_Y)\gamma^1 \times (1 + \beta_M)}{(1 + \alpha)}$$

$$C_4 = C_2 \times \frac{(1 + \alpha_{Y+M})}{(1 + \alpha_{Y+M})\gamma^2} \times \frac{(1 + \alpha_{Y+M})\gamma^2(1 + \beta_C)}{(1 + \alpha)}$$

$$K_4 = K_4 \times \frac{(1 + \alpha_{Y+M+C})}{(1 + \alpha_{Y+M+C})\gamma^3} \times$$

-continued $$\frac{(1 + \alpha_{Y+M+C})\gamma^3(1 + \beta_K)}{(1 + \alpha)}$$

Herein, when $\gamma_1$, $\gamma_2$, $\gamma_3$>1, the correction amount of the second term is reduced, and the reduced amount is added to the third term. Further, when $\gamma_1$, $\gamma_2$, $\gamma_3$<1, the correction amount of the second term is increased. When =0, Expression (2) coincides with Expression (1). Of course, (1+β) $\gamma_i$ is put in the denominator of the third term, and when this term is multiplied by the second term, the different structure is obtained.

The Expression (4) shows the KNC correction when development is conducted in the order of Y, M, C, K. Although the order of development is limited to Y→M→C→K in the Expression, the present invention is not limited to this. For example, K→C→M→Y, K→Y→M→C, or the like is also possible.

$Y_2$, $M_2$, $C_2$, $_{K2}$ which is $D_2$ of the first row, is the image density data in which an average slippage between images is previously corrected.

The second row is a correction term to correct the slippage by the structure between images. When there is no previous toner image, the correction term is 1 because $\alpha_Y$=0, and the latent image is not corrected. When there is a previous toner image, because $\alpha_Y \neq 0$, the latent image is corrected. Concretely, when γ>1, the correction is carried out so that the latent image area is decreased. This corrected amount is reflected on data for the intensity modulation.

The third row is a correction term to correct the slippage between image data and reproduction image. When there is no previous toner image, because $\alpha_Y$=0, the latent image potential is not corrected. When there is a previous toner image, because $\alpha_Y \neq 0$, the latent image potential is corrected. In this Expression, α, f, g, and β are variables of the density distribution of each color toner, which are formed of the Laplacean filter multiplied by a factor, or a corresponding table which is made experimentally. These first –third rows are corresponding to the above-described first–third correction.

As described above, according to the present invention, the apparatus is provided with the above structure, and thereby, the color reproducibility can be improved by the KNC process using the inner exposure system.

Further, due to the above structure, when correction is carried out by considering the image density distribution when toner images are superimposed, recording image data is made, and from this, when the light modulation is carried out, the influence due to superimposition can be corrected. Thereby, the color image forming apparatus can be provided, in which the quality of color reproduction of edges, fine lines, isolated points, etc., can be increased.

What is claimed is:

1. A color image forming method comprising the steps of:
    charging a front surface of an image forming body;
    exposing image wise onto said charged front surface from a rear surface of said image forming body so that a latent image is formed on said front surface;
    developing said latent image with a color toner so that a color toner image is formed on said front surface; and
    repeating said steps of charging, exposing and developing so that a multicolor toner image is formed on said front surface;
    wherein a two color toner image, which consists of two color toners which respectively form first and second color toner images, is formed when said two color toner image is formed at a maximum density by exposing at an exposure amount $E_a$ for a first color toner of said two color toners and exposing at an exposure amount $E_{b2}$ for a second color toner of said two color toners;

wherein said exposure amounts $E_a$ and $E_{b2}$ are smaller than an exposure amount $E_c$ of a single color toner image when said single color toner image is formed at the maximum density.

2. The color image forming method of claim 1, wherein said two color toner image is formed at the maximum density, the method further comprising the step of:

forming the second color toner image of said two color toner image by correcting an exposure amount thereof so as to be 5% to 50% larger than that of the first color toner image of said two color toner image.

3. The color image forming method of claim 1, wherein said two color toner image is formed at the maximum density, the method further comprising the step of:

forming the first and second color toner images of said two color toner image by exposing at an exposure amount smaller than that for forming said single color toner image at the maximum density.

4. The color image forming method of claim 1, wherein said two color toner image is formed at the maximum density, the method further comprising the step of:

forming the second color toner image of said two color toner image by correcting an exposure amount thereof wherein a correction amount of said exposure amount is increased as said exposure amount is increased.

5. The color image forming method of claim 1, wherein when said two color toner image is formed at the maximum density, the method further comprising the step of:

forming each of the first and second color toner images of said two color toner image at a predetermined exposure amount according to respective image patterns.

6. The color image forming method of claim 5, wherein said image patterns comprise at least one of a solid graphic image, a fine line graphic image and various point character images.

7. A color image forming method comprising the steps of:

charging a front surface of an image forming body;

exposing image wise onto said charged front surface from a rear surface of said image forming body so that a latent image is formed on said front surface;

developing said latent image with a color toner so that a color toner image is formed on said front surface; and repeating said steps of charging, exposing and developing so that a multicolor toner image is formed on said front surface;

wherein a two color toner image, which consists of two color toners, is formed when said two color toner image is formed at a maximum density, including the steps of:

forming a first color toner image of said two color toner image by exposing the first color toner image at an exposure amount smaller than that for forming a single color toner image at a maximum density, not less than a half decay exposure amount $E_{1/2}$ of said image forming body, and not larger than twice said half decay exposure amount $E_{1/2}$.

8. The color image forming method of claim 7, wherein said two color toner image is formed at the maximum density, the method further including the step of:

forming a second color toner image of said two color toner image by correcting an exposure amount thereof so as to be 5% to 50% larger than that of the first color toner image of said two color toner image.

9. The color image forming method of claim 7, wherein said two color toner image is formed at the maximum density, the method further including the step of:

forming a second color toner image of said two color toner image by exposing the second color toner image at an exposure amount smaller than that for forming said single color toner image at the maximum density.

10. The color image forming method of claim 7, wherein said two color toner image is formed at the maximum density, the method further including the step of:

forming a second color toner image of said two color toner image by correcting an exposure amount thereof wherein a correction amount of said exposure amount is increased as said exposure amount is increased.

11. The color image forming method of claim 7, when said two color toner image is formed at the maximum density, the method further comprising the step of:

forming each of the first and second color toner images of said two color toner image at a predetermined exposure amount according to respective image patterns.

12. The color image forming method of claim 11, wherein said image patterns comprise at least one of a solid graphic image, a fine line graphic image and various point character images.

13. A color image forming apparatus comprising:

a charger for charging a front surface of an image forming body;

an exposer member for exposing image wise onto said charged front surface from a rear surface of said image forming body so that a latent image is formed on said front surface; and a developer for developing said latent image with a color toner so that a color toner image is formed on said front surface;

wherein said charging, said exposing and said developing are repeated so that a multicolor toner image is formed on said front surface and a two color toner image, which includes two color toners, is formed when said two color toner image is formed at a maximum density by exposing at an exposure amount $E_a$ for a first color toner of said two color toners and at an exposure amount $E_{b2}$ for a second color toner of said two color toners wherein said exposure amounts $E_a$ and $E_{b2}$ are smaller than an exposure amount $E_c$ of a single color toner image when said single color toner image is formed at the maximum density.

14. The color image forming apparatus 13 further comprising:

a correction member for correcting a multi-valued recording image data by image density and image density distribution data; and a modulator for optically modulating an exposure beam of said exposing member for recording dots by one of pulse width modulation and intensity modulation in accordance with said multi-valued recording image data corrected by said correction member;

wherein said exposer conducts said image wise exposure by said optically modulated exposure beam.

15. A color image forming apparatus, comprising:

a charger for charging a front surface of an image forming body;

an exposing member for exposing image wise onto said charged front surface from a rear surface of said image forming body so that a latent image is formed on said front surface; and a developer for developing said latent image with a color toner so that a two color toner image is formed on said front surface;

wherein said charging, said exposing and said developing are repeated so that a multicolor toner image is formed on said front surface and a two color toner image, which consists of two color toners, is formed when said two color toner image is formed at a maximum density, such that:

a first color toner image of said two color toner image is formed by exposing at an exposure amount smaller than that for forming a single color toner image at the maximum density, not less than a half decay exposure amount $E_{1/2}$ of said image forming body, and not larger than twice said half decay exposure amount $E_{1/2}$.

16. The color image forming apparatus of claim 15, wherein a second color toner image of said two color toner image is formed by correcting an exposure amount thereof wherein a correction amount of said exposure amount is increased as said exposure amount is increased.

17. The color image forming of claim 15 further comprising:

a correction member for correcting a multi-valued recording image data by image density and image density distribution data; and a modulator for optically modulating an exposure beam of said exposing member for recording dots by one of pulse width modulation and intensity modulation in accordance with said multi-valued recording image data corrected by said correction member;

wherein said exposing member conducts said image wise exposure by said optically modulated exposure beam.

18. The color image forming apparatus of claim 17, wherein said correction member further includes:

a first correction section for correcting an average displacement among color component images of said recording image data; and a second correction for correcting a local displacement due to a structure among color component images of said recording image data.

19. The color image forming apparatus of claim 18, wherein said first correction section and said second correction section correspond to one of said pulse width modulation and intensity modulation.

* * * * *